United States Patent
Rezaiifar et al.

(10) Patent No.: US 6,618,375 B2
(45) Date of Patent: *Sep. 9, 2003

(54) RADIO LINK PROTOCOL FRAME SORTING MECHANISM FOR DYNAMIC CAPACITY WIRELESS DATA CHANNELS

(75) Inventors: Ramin Rezaiifar, San Diego, CA (US); Nischal Abrol, San Diego, CA (US); Nikolai Leung, San Diego, CA (US); Stein S. Lundby, San Diego, CA (US)

(73) Assignee: Qualcomm, Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,974

(22) Filed: Sep. 13, 1999

(65) Prior Publication Data

US 2003/0067920 A1 Apr. 10, 2003

(51) Int. Cl.[7] .............................. H04L 12/56; H04J 3/52
(52) U.S. Cl. ....................................... 370/394; 370/470
(58) Field of Search ................................ 370/320, 322, 370/329, 335, 341, 342, 348, 441, 466, 468, 470, 472, 476, 477, 394

(56) References Cited

U.S. PATENT DOCUMENTS

| | | | | |
|---|---|---|---|---|
| 5,638,412 A | | 6/1997 | Blakeney, II et al. | |
| 5,708,656 A | * | 1/1998 | Noneman et al. | 370/320 |
| 5,793,744 A | * | 8/1998 | Kanerva et al. | 370/209 |
| 5,936,948 A | * | 8/1999 | Sicher | 370/314 |
| 5,949,773 A | * | 9/1999 | Bhalla et al. | 370/331 |
| 6,205,168 B1 | * | 3/2001 | Somayazulu | 375/149 |
| 6,307,867 B1 | * | 10/2001 | Roobol et al. | 370/470 |

FOREIGN PATENT DOCUMENTS

| | | |
|---|---|---|
| EP | 0877513 | 11/1998 |
| WO | 9944341 | 9/1999 |

* cited by examiner

Primary Examiner—Alpus H. Hsu
Assistant Examiner—Toan D. Nguyen
(74) Attorney, Agent, or Firm—Philip Wadsworth; Kent D. Baker; Albert J. Harnois

(57) ABSTRACT

The present invention is a novel and improved method and system that prevents RLP3E from generating unnecessary NAKs, thus preventing unnecessary data frame retransmissions. The present invention is efficient, neither delaying the delivery of data frames to the higher data services layer nor delaying the delivery of necessary NAKs to the multiplex sublayer. Additionally, the present invention can be implemented with minimal changes to an existing RLP3E implementation. The present invention is applicable to systems such as cdma2000, W-CDMA, and EDGE, wherein data is transferred using an ARQ (automatic request for retransmission) mechanism, and wherein data packets are sometimes received in an order different from that in which they were transmitted.

16 Claims, 12 Drawing Sheets

RADIO LINK PROTOCOL FRAME SORTING MECHANISM FOR DYNAMIC CAPACITY WIRELESS DATA CHANNELS

BACKGROUND OF THE INVENTION

I. Field of the Invention

The current invention relates to wireless communications. More particularly, the present invention relates to an improved method and system for reliably transmitting data through a wireless channel while minimizing the overhead inherent in the error control protocol.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95-B.

IS-95-B was originally optimized for transmission of variable-rate voice frames. In order to support two-way voice communications, as typified in wireless phone applications, it is desirable that a communication system provide fairly constant and minimal data delay. For this reason, IS-95-B systems are designed with powerful forward error correction (FEC) protocols and vocoders which are designed to respond gracefully to voice frame errors. Error control protocols which require frame retransmission procedures add unacceptable delays to voice transmission, so are not designed into the IS-95-B specification.

The optimizations, which make the stand-alone IS-95-B specification ideal for voice applications, make it difficult to use for packet data applications. In many non-voice applications, such as the transmission of Internet protocol (IP) data, the delay requirements of the communication system are much less stringent than in voice applications. In the Transmission Control Protocol (TCP), probably the most prevalent of protocols used in an IP network, virtually infinite transmission delays are allowed in order to guarantee error-free transmission. TCP uses retransmissions of IP datagrams, as IP packets are commonly called, to provide this transport reliability.

IP datagrams are generally too large to fit into a single IS-95-B frame. Even after dividing an IP datagram into segments small enough to fit into a set of IS-95-B frames, the entire set of IS-95-B frames would have to be received without error for the single IP datagram to be useful to TCP. The targeted frame error rate typical of an IS-95-B system make the probability of error-free reception of all segments of a single datagram very low.

As described in IS-95-B, alternative service options enable the transmission of other types of data in lieu of voice frames. Telecommunications Industry Association Interim Standard TIA/EIA/IS-707-A, entitled "DATA SERVICE OPTIONS FOR SPREAD SPECTRUM SYSTEMS", hereinafter referred to as IS-707, describes a set of procedures used in the transmission of packet data in an IS-95-B system.

Radio Link Protocol (RLP) is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2, and incorporated herein by reference. RLP2 incorporates an error control protocol with frame retransmission procedures over the IS-95-B frame layer. RLP is of a class of error control protocols known NAK-based ARQ protocols, which are well known in the art. The IS-707 RLP, facilitates the transmission of a byte-stream, rather than a series of voice frames, through an IS-95-B communication system.

Several protocol layers typically reside above the RLP layer. IP datagrams, for example, are typically converted into a Point-To-Point Protocol (PPP) byte stream before being presented as a byte stream to the RLP protocol layer. As the RLP layer ignores the protocol and framing of higher protocol layers, the stream of data transported by RLP is said to be a "featureless byte stream".

RLP was originally designed to satisfy the requirements of sending large datagrams through an IS-95-B channel. For example, if an IP datagram of 500 bytes were to be simply sent in IS-95-B frames carrying 20 bytes each, the IP datagram would fill 25 consecutive IS-95-B frames. Without some kind of error control layer, all 25 of these RLP frames would have to be received without error in order for the IP datagram to be useful to higher protocol layers. On an IS-95-B channel having a 1% frame error rate, the effective error rate of the IP datagram delivery would be $(1-(0.99)^{25})$, or 22%. This is a very high error rate compared to most networks used to carry Internet Protocol traffic. RLP was designed as a link layer protocol that would decrease the error rate of IP traffic to be comparable to the error rate typical of a 10Base2 ethernet channel.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission. The Telecommunications Industry Association is currently developing the cdma2000 proposal as interim standard TIA/EIA/IS-2000, and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as W-CDMA. A third proposal was submitted by U.S. TG 8/1 entitled "The UWC-136 Candidate Submission", hereinafter referred to as EDGE. The contents of these submissions is public record and is well known in the art.

RLP2 was designed for use with IS-95-B. A new RLP designed for use with cdma2000 is described in TIA/EIA/IS-707-A-1.10, entitled "DATA SERVICE OPTIONS FOR SPREAD SPECTRUM SYSTEMS: RADIO LINK PROTOCOL TYPE 3", hereinafter referred to as RLP3E, and incorporated herein by reference.

In reference to the description of the related art, two items commonly referred to as frames have the following distinction:

In IS-95-B and cdma2000, the basic timing interval is termed a frame. A frame of this variety is hereinafter referenced as a CDMA frame. A CDMA frame can contain signaling information, primary traffic, secondary traffic, or combinations thereof.

In RLP3E, the basic unit of transmission is termed a frame. A frame of this variety is hereinafter referenced as an RLP frame. An RLP frame can contain payload data, a sequence number, RLP control information (e.g. SYNC, NAK, etc.), or combinations thereof. All references to sequence numbers hereinafter are references to RLP sequence numbers.

In IS-95-B, the fundamental and supplemental channels have CDMA frames that are of a fixed 20 ms (20 millisecond) duration. CDMA frames transmitted on IS-95-B supplemental channels are transmitted at the same time that a CDMA frame is transmitted on the fundamental channel. As all IS-95-B supplemental CDMA frames are of a fixed 20 ms duration, all fundamental and supplemental CDMA frames that begin transmission at the same time will later be received by the receiver at the same time.

cdma2000 has a supplemental channel structure which differs quite significantly from that of IS-95-B. cdma2000 allows for 2 supplemental channels, hereinafter referred to as supplemental 1 and supplemental 2. During service negotiation the mobile station and the base station negotiate a configuration, part of which is the supplemental channel CDMA frame duration(s). The durations that can be negotiated for each supplemental channel are: 20 ms, 40 ms, and 80 ms. It is conceivable, that in the future, durations could include alternate or additional values, such as 60 ms. If a 60 ms CDMA frame length never comes into existence, it in no way detracts from the need nor the value of the present invention. However, because a value of 60 ms is conceivable, and the present invention takes into account durations that, are not presently utilized in cdma2000, various scenarios are presented throughout this specification which assume the existence of a 60 ms CDMA frame duration.

As the amount of data that can be transmitted in a channel is related to the CDMA frame duration, hereinafter CDMA frame durations are referenced as CDMA frame lengths. cdma2000 allows the negotiated configuration to be one in which the CDMA frame length for supplemental 2 is different than the CDMA frame length for supplemental 1. Any telecommunications system that supports the concurrent transmission of data packets on different code channels from one entity, such as a cdma2000 base station, capable of transmitting user data on a fundamental and supplemental channel(s) concurrently, to another entity, such as a cdma2000 mobile, is hereafter referenced as a cdma2000-like system.

In RLP2, RLP3E, and all existing RLP implementations, three variables are maintained at either side of an RLP protocol link. These variables are V(R), V(N) and V(S). As discussed in the RLP standards, V(R) contains the expected value of the RLP frame sequence number field in the next new frame to be received. V(N) contains the sequence number of the next needed frame not received in sequence. The sequence number field 'SEQ' in each new RLP data frame sent, and in each RLP idle frame sent, shall be set to V(S). Each of the variables V(R), V(N), and V(S), are the shortened (8-bit), over-the-air versions of the full (12-bit) sequence numbers L_V(R), L_V(N) and L_V(S) also maintained at either side of an RLP protocol link.

RLP2 and all other RLPs are essentially designed as state machines called from the multiplex sublayer every 20 ms. At each 20 ms interval, the multiplex sublayer delivers to RLP a set of frames received from the physical layer. Each time the multiplex sublayer delivers a set of frames to the RLP state machine, also known as the RLP engine, the RLP state machine compares the sequence number(s) of the just received frames to L_V(R) and L_V(N). In the event that RLP finds a new 'hole' was created, a NAK is generated. The term 'hole' is commonly used by those skilled in the art to denote that a set frames containing non-consecutive sequence numbers was received by the RLP3E engine. A 'new hole' is created whenever the updated L_V(R) is different from the previous L_V(R), and all frames received with sequence numbers greater than the previous L_V(R) do not have consecutive sequence numbers.

RLP3E is similar to RLP2 in many respects. In part, this was done to gain the many benefits that code reuse can provide. RLP3E was designed, as was RLP2, to associate a frame sequence number with each RLP frame transmitted and received. Whenever an unexpected sequence number is received, a request for retransmission, referred to as a NAK, is sent to the peer RLP entity.

No unnecessary retransmissions are generated In RLP2 because all IS-95-B CDMA frames transmitted at the same time are received by the receiver at the same time. If an RLP2 state machine finds that a hole has been created by the receipt of a 20 ms set of frames from the multiplex sublayer, due to the simultaneous transmission of all frames on the supplemental channels, it means that the frames in the hole have been lost or corrupted in route to the receiver. As such a NAK generated for such a hole is not unnecessary, as the retransmission of the frames in the hole are desirable. Utilizing the same methodology, however, causes RLP3E to generate unnecessary retransmissions because of the flexible nature of the cdma2000 supplemental channels. This is because, as described earlier, it is possible in cdma2000 for supplemental channels to vary in CDMA frame length. Such variations can unintentionally cause RLP3E to detect holes and cause the generation of unnecessary NAKs.

For example, FIG. 1A shows a 160 ms time interval of generated RLP data frames for an RLP3E data call in which there are a fundamental channel and two supplemental channels. As illustrated, supplemental 1 has a CDMA frame length of 80 ms, supplemental 2 has a CDMA frame length of 60 ms, and the RLP sequence number at the beginning of this time interval is 5. At time 0 the multiplex sublayer asks the RLP engine for three frames of lengths corresponding to the frame duration of the fundamental channel and each supplemental channel. In response, the RLP engine generates three RLP frames having sequence numbers 5, 6, and 7. At the 20 ms boundary the RLP frame having sequence number 8 is generated in response to the multiplex sublayer asking for a single frame of a length corresponding to the fundamental channel. At the 40 ms boundary an RLP frame containing sequence number 9 is generated. At the 60 ms boundary the multiplex sublayer asks for frames of lengths corresponding to the fundamental channel and supplemental 2. In response, the RLP engine generates two RLP frames having sequence numbers 10 and 11. Likewise, RLP frames with sequence numbers 12 and 13 are generated at the 80 ms boundary for like reasons. Frames 14–17 are generated for like reasons at the times illustrated in FIG. 1A.

The receipt of the aforementioned frames by the receiving RLP3E engine is illustrated in FIG. 1B. FIG. 1B does not show the length/duration of the received frames, as is done in FIG. 1A. Rather, FIG. 1B shows the time at which the frame is given to the RLP3E receive engine from the receiving multiplex sublayer. FIG. 1B assumes there is zero delay from the time the frame transmission completed in FIG. 1A to the time that the RLP3E receive engine has the frame delivered to it by the multiplex sublayer. For example, because the transmission of frame 5 finishes at time 20 ms in FIG. 1A, it is received by the RLP3E receive engine at time 20 ms in FIG. 1B. Because the transmissions of frames 7 and 9 complete at 60 ms in FIG. 1A, they are received for processing by the RLP3E engine at 60 ms in FIG. 1B. Likewise, because the transmissions of frames 6 and 10 complete at time 80 ms in FIG. 1A, these frames are received for processing by the RLP3E receive engine at time 80 ms in FIG. 1B. The receipt of frame 8, and frames 11 through 17, are diagrammed in a similar manner.

As is evident by comparison of the figures, RLP frames transmitted with ordered incremental sequence numbers are not received in order by the receiving RLP engine. Although the frames began transmission in the same sequence that the RLP3E generated the sequence numbers in, the frames were received in a different order. Namely, CDMA frames containing RLP sequence numbers 5 through 17 were transmitted in the following order 5,6,7,8,9,10,11,12,13,14,15,16,17, yet were received in the order of 5,8,7,9,6,10,12,11,14,15, 13,17,16 owing to the differences in frame duration. As would be evident to one skilled in the art, NAKs would be generated for frames 6,7,11,13, and 16 due to the timing and order at which frames 8, 12, 14, and 17 were received.

As one skilled in the art is aware, the generation of NAKs should only be done when the receiver failed to receive a transmission of an RLP data frame that it should have already received. However, due to the varying CDMA frame lengths of cdma2000, unnecessary NAKs can be generated due to the timing at which sequence numbers are received. This causes the undesirable effect of wasting valuable bandwidth both on the forward and reverse links. The bandwidth is wasted by each NAK transmitted on one link and by the unnecessary retransmitted data frame on the opposite link (an unnecessary retransmitted data frame is generated for each received unnecessary NAK).

As over-the-air bandwidth is a valuable resource, an improved method of delivering data over cdma2000 is desirable. In particular, a method for delivering data over cdma2000 that doesn't generate unnecessary NAKs and retransmissions is highly desirable. It is desirable that such a method neither increases the latency of the delivery of data frames to the layer above RLP nor increases the latency of the delivery of valid NAK frames to the multiplex sublayer. It is particularly desirable that such a method leverage existing work by requiring minimal changes to existing implementations of RLP3E.

SUMMARY OF THE INVENTION

The present invention is a novel and improved method and system that prevents RLP3E from generating unnecessary NAKs, thus also preventing unnecessary data frame retransmissions. The present invention is efficient, neither delaying the delivery of data frames to the higher data services layer, nor delaying the delivery of necessary NAKs to the multiplex sublayer. Additionally, the present invention can be implemented with minimal changes to an existing RLP3E implementation. The present invention is applicable to systems such as cdma2000, W-CDMA, and EDGE, wherein data is transferred using an ARQ (automatic request for retransmission) mechanism, and wherein data packets are sometimes received in an order different from that in which they were transmitted.

In relation to the transmission and receipt of RLP frames, RLP3E currently communicates with a multiplex sublayer below it and a byte stream layer above it. The byte stream layer is commonly referred to as the PPP layer, because PPP is commonly the protocol used in the byte stream layer. However, as the byte stream layer need not be PPP (it could be ISDN, or one of a plurality of protocols), it is herein referred to as the byte stream layer. The aforementioned communication flow is illustrated in FIG. 2, a block diagram showing the data path for cdma2000.

The present invention utilizes a new mechanism interposed between the multiplex sublayer and the RLP3E layer for all incoming traffic. The purpose of this sublayer is to reorder the received packets into the order in which they were transmitted, and to deliver the packets to the RLP3E layer in said order. This sublayer is hereafter called the frame reordering sublayer, and, is illustrated as such in FIG. 3.

The frame reordering sublayer reorders frames received by the multiplex sublayer by determining the order in which physical layer frames were transmitted by its peer, and by buffering each received frame until all frames transmitted prior to it have been received. The frame reordering sublayer accomplishes this by means of timers and/or frame counters, and a memory buffering mechanism.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1A:
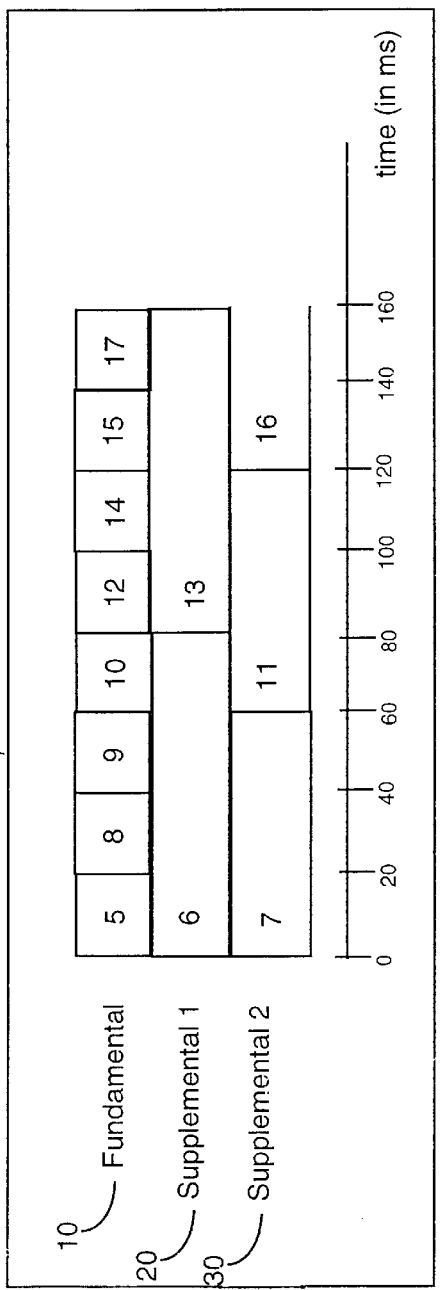
FIGS. 1A and 1B are timeline diagrams illustrating the time-relationship of data frames transmitted and received on the exemplary multi-channel data network similar to cdma2000.
Figure 1B:
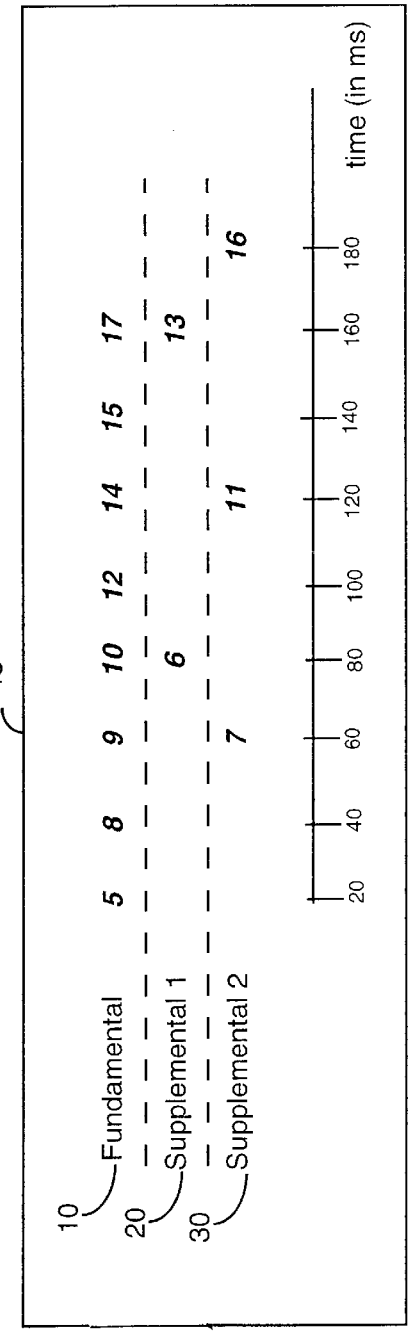

FIG. 1A and FIG. 1B are timeline diagrams illustrating the time-relationship of data frames transmitted and received on a wireless data network similar to cdma2000. FIG. 1A illustrates a 160 ms time interval of RLP data frames generated for an RLP3E data transmission system 5 consisting of a fundamental channel 10 and two supplemental channels. A first supplemental channel 20 is configured to an 80 ms CDMA frame duration, while a second supplemental channel 30 is configured to a 60 ms CDMA frame duration. The illustration assumes that at the beginning of the 160 ms time interval, the RLP3E engine has V(S) set to 5. As illustrated, fundamental channel 10 transmits 20 ms CDMA frames containing RLP3E frames of sequence numbers 5,8,9,10,12,14,15, and 17. A first supplemental channel 20 transmits 80 ms CDMA frames containing RLP3E frames of sequence numbers 6 and 13. A second supplemental channel 30 transmits 60 ms CDMA frames containing RLP3E frames of sequence numbers 7, 11, and 16. As illustrated in FIG. 1A, the frames having sequence numbers 5, 6, and 7 begin transmission at time 0. Frame 5, the CDMA frame containing an RLP3E frame of sequence number 5, finishes transmission on Fundamental channel 10 at time 20. Frame 6 finishes transmission on first supplemental 20 at time 80, and frame 7 finishes transmission second supplemental 30 at time 60. The times at which frames 8–16 begin and end transmission are illustrated in a similar manner.

FIG. 1B illustrates a 160 ms time interval of RLP data frames received for an RLP3E data reception system 45 consisting of fundamental channel 10, first supplemental channel 20, and second supplemental channel 30. FIG. 1B illustrates the times at which the data frames transmitted in FIG. 1A are received by a peer cdma2000 communications device. The supplemental and fundamental channels are labeled 10, 20, and 30 in FIG. 1B to indicate that these are references to the same channels used by transmission system 5 in FIG. 1A. As illustrated, RLP3E data reception system 45 receives RLP3E frames immediately following their completed transmission by RLP3E data transmission system 5. Introduction of an arbitrary propagation delay common to fundamental channel 10, the first supplemental channel 20, and the second supplemental channel 30, does not alter the explanation and has been omitted for the sake of simplicity. Frame 5 is received by RLP3E data reception system 45 on fundamental 10 at time 20. Frame 6 is received by RLP3E data reception system 45 on first supplemental 20 at time 80. Frame 7 is received by RLP3E data reception system on second supplemental 30 at time 60. The times at which frames 8–16 are received are illustrated in a similar manner.

By examination of both FIG. 1A and FIG. 1B it is evident that the frames are received by RLP3E data reception system 45 in a different order from that which they were transmitted in by RLP3E data transmission system 5.

Figure 2:
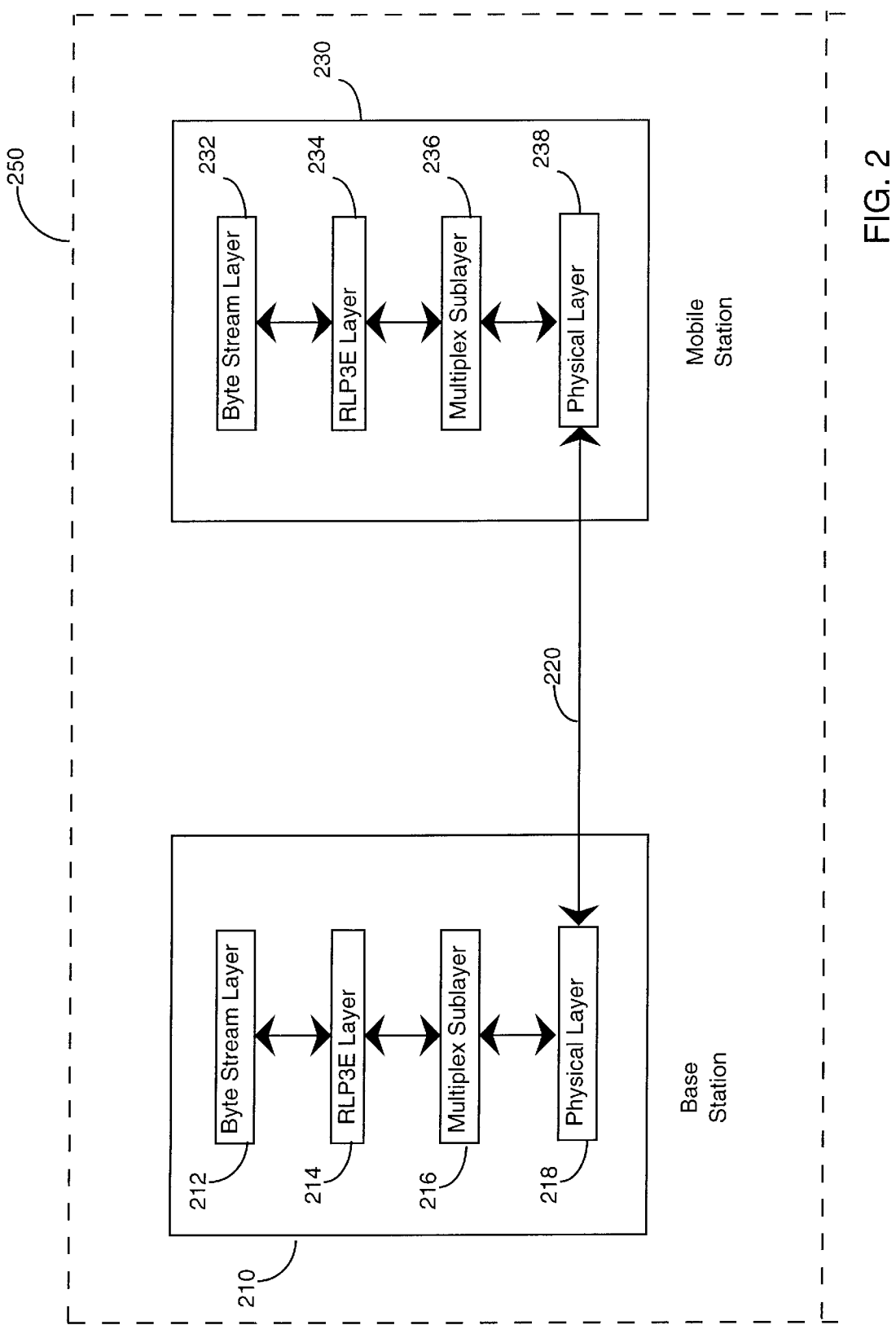
FIG. 2 is a functional block diagram of an exemplary embodiment of a cdma2000 RLP3E transmission system.

FIG. 2 is a functional block diagram of an exemplary embodiment of a cdma2000 data transmission system 250 embodied in communication devices 210 and 230. For illustrative purposes, the cdma2000 data transmission system is described in terms of transmission of packet data on the forward link. However, the teachings are easily extended to apply to reverse link transmissions. In base station 210, there exists a byte stream layer 212 that provides a stream of bytes to RLP3E layer 214. RLP3E layer 214 buffers these bytes for later transmission. At frame boundary intervals of 20 ms, multiplex sublayer 216 requests RLP frames from RLP3E layer 214, in response to which RLP3E layer generates RLP frames in accordance with the RLP3E specification and provides them to multiplex sublayer 216. The RLP3E specification does not specify that the RLP3E layer shall assign frame sequence numbers in accordance with the frame lengths requested by the multiplex sublayer. In the exemplary embodiment, multiplex sublayer 216 encapsulates these RLP frames in accordance with the cdma2000 specification. Multiplex sublayer 216 then provides these encapsulated RLP frames to physical layer 218 for transmission over cdma2000 air link 220 in accordance with the cdma2000 specification. When providing frames to physical layer 218, multiplex sublayer 216 indicates which frames are to be transmitted on which channels.

Physical layer 238, of mobile station 230, receives frames from cdma2000 air link 220. At 20 ms intervals, physical layer 238 provides each received frame to multiplex sublayer 236, and indicates to multiplex sublayer 236 which channel each frame was received on. Multiplex sublayer 236 unencapsulates the RLP frames in accordance with the cdma2000 specification and provides the RLP frames to RLP3E layer 234. RLP3E layer 234 performs RLP frame processing on these frames in accordance with the RLP3E specification. In the event that any received frame has a sequence number equal to V(N) the payload of all received RLP frames having consecutive sequence numbers beginning with V(N) are provided to byte stream layer 232 by RLP3E layer 234. In the event that a new hole is created, a NAK is generated to signal that one or more data frames need to be retransmitted.

The above description describes an exemplary embodiment of cdma2000 data flow in the forward link direction. As is known by one skilled in the art, data flow occurs in the reverse link direction along a path in the opposite direction.

Figure 3:
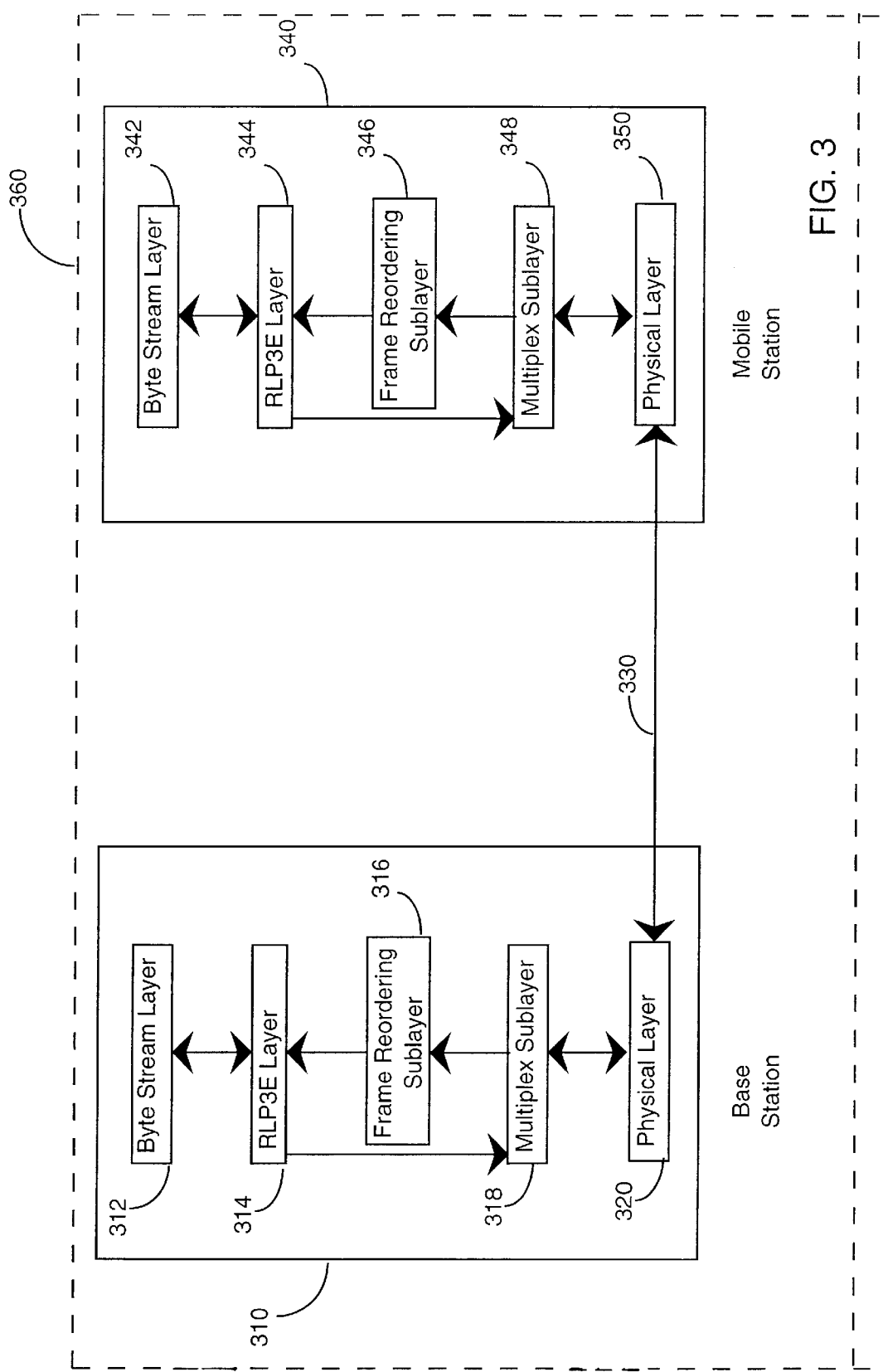
FIG. 3 is a functional block diagram of an exemplary embodiment of the transmission system of the present invention.

FIG. 3 is a functional block diagram of an exemplary embodiment of the data services transmission system 360 of the present invention embodied in communication devices 310 and 340. In base station 310, there exists a byte stream layer 312 that provides a stream of bytes to RLP3E layer 314. The bytes provided to the RLP3E are generally in PPP frame format, however RLP3E treats these bytes as a raw byte stream and thus any formatting of the bytes at byte stream layer 312 is inconsequential to the present invention. RLP3E layer 314 buffers the received bytes for later transmission in accordance with the present RLP3E specification. At frame boundary intervals of 20 ms, multiplex sublayer 318 requests RLP frames from RLP3E layer 314. In accordance with these requests, RLP3E layer generates RLP frames in accordance to the methodology of the present invention.

The methodology of the current invention utilizes an RLP3E layer 314 which adheres to the current RLP3E specification and which also adheres to the following restriction. When multiplex sublayer 314 requests data frames for multiple channels from RLP3E layer 314, and wherein RLP3E layer 314 will generate multiple new data frames (RLP frames that are not retransmissions), RLP3E layer 314 is hereby required to place the lowest new sequence number in the new data frame having the smallest CDMA frame length and to place the highest sequence number in the new data frame having the largest CDMA frame length. This restriction helps frame reordering sublayer 346, further discussed in reference to FIG. 5, FIG. 6, FIG. 7, FIG. 8, FIG. 9, and FIG. 10, accurately determine when it should deliver received frames to RLP3E layer 344.

Multiplex sublayer 318 encapsulates the RLP frames provided to it by RLP3E layer 314 in accordance with the cdma2000 specification. Multiplex sublayer 318 then provides these encapsulated RLP frames to physical layer 320 for transmission over cdma2000 air link 330 in accordance with the cdma2000 specification. When providing frames to physical layer 320, multiplex sublayer 318 indicates which frames are to be transmitted on which channels.

Physical layer 350, of mobile station 340, receives frames from cdma2000 air link 330. At 20 ms intervals physical layer 350 provides each received frame to multiplex sublayer 348, and indicates to multiplex sublayer 348 which channel each frame was received on. Multiplex sublayer 348 unencapsulates the RLP frames in accordance with the cdma2000 specification and provides them to frame reordering sublayer 346. Frame reordering sublayer 346, described in reference to FIG. 4 and FIG. 5, buffers the received RLP frames according to the methodology of the present invention, and provides them to the RLP3E layer 344 in the order at which they were transmitted. RLP3E layer 344 performs RLP frame processing on these frames in accordance with the RLP3E specification. In the event that any received frame has a sequence number equal to V(N) the payload of all received RLP frames having consecutive sequence numbers beginning with V(N) are provided to byte stream layer 342 by RLP3E layer 344. In the event that a new hole is detected, a NAK is generated to signal that one or more data frames need to be retransmitted.

Figure 4:
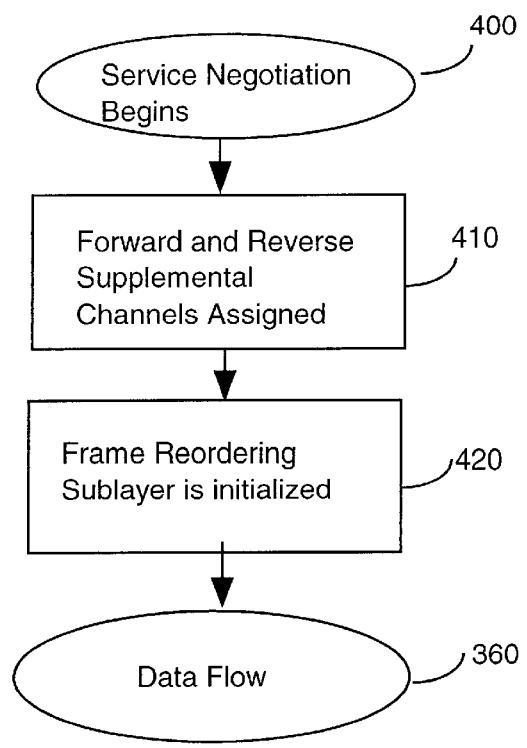
FIG. 4 is a high-level flowchart of an exemplary embodiment of the call setup flow of the present invention.

FIG. 4 is a flow chart illustrating an exemplary embodiment of the initialization of frame reordering sublayer 346 during call setup. In block 400, service negotiation begins. In the exemplary embodiment, service negotiation is performed in accordance with the method described in U.S. Pat. No. 5,638,412, entitled "METHOD FOR PROVIDING SERVICE NEGOTIATION IN A MOBILE COMMUNICATION SYSTEM," which is assigned to the assignee of the present invention and incorporated by reference herein. In block 410, the number of active supplemental channels, the supplemental channel offsets (SCH_OFFSETs), and the supplemental channel frame durations are determined, and these channels are assigned accordingly.

Figure 9A:
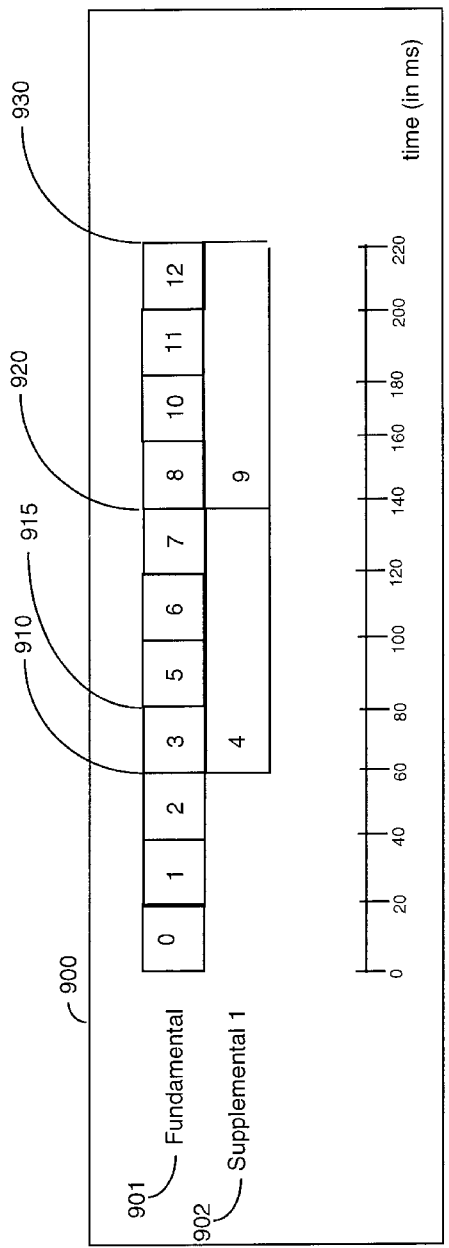
FIG. 9A is a timeline diagram illustrating the timing at which various RLP frames are transmitted in an exemplary cdma2000-like system in which there is one active supplemental channel.

Once the channels are assigned, the process moves to block 420. In block 420, frame reordering sublayer 346 initializes variables and timers. The number of active supplemental channels is recorded. If supplemental channel 1 is active, the frame duration for that channel is recorded and a timer is set to the value of its offset. If supplemental channel 2 is active, the frame duration for that channel is recorded and a timer is set to the value of its offset. For example, if the system were configured as illustrated in FIG. 9A, a timer would be set for 60 ms. The timer would thus expire at time 60, point 910, indicating the time that base station 310 first transmits a frame on supplemental 1. Additionally, it would be recorded that the frame duration on supplemental 1 is 80 ms.

Figure 9B:
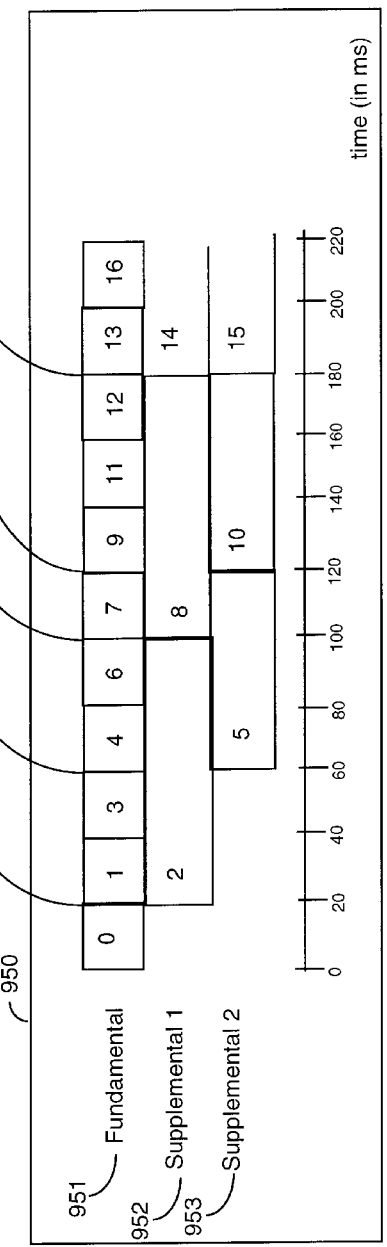
FIG. 9B is a timeline diagram illustrating the timing at which various RLP frames are transmitted in an exemplary cdma2000-like system in which there are two active supplemental channels.

As another example, if the system were configured as illustrated in FIG. 9B, a first timer would be set for 20 ms and a second timer would be set for 60 ms. The first timer would expire at time 20, point 960, indicating the time that base station 310 first transmits a frame on supplemental 1, while the second timer would expire at time 60, indicating that the time that base station 310 first transmits a frame on supplemental 2. Additionally, it would be recorded that the frame duration on supplemental 1 is 80 ms and that the frame duration on supplemental 2 is 60 ms.

In an alternative embodiment, if there is exactly one active supplemental channel, the timer is initialized to a time equal to the channel offset plus 20 milliseconds.

In the exemplary embodiment, common indices among variables and timers denote an association with one another. For example, SUP_DURATION[1] and SUP_TIMER[1] are associated because both have index 1. All such timers and variables can be referenced by using a variable to represent an index. For example, SUP_DURATION[1] can be referenced as SUP_DURATION[X] if X has a value of 1, while SUP_DURATION[2] can be referenced as SUP_DURATION[X] if X has a value of 2. This indexing notation, known to those familiar in the art, will be used hereafter in reference to several variables and timers.

Figure 6:
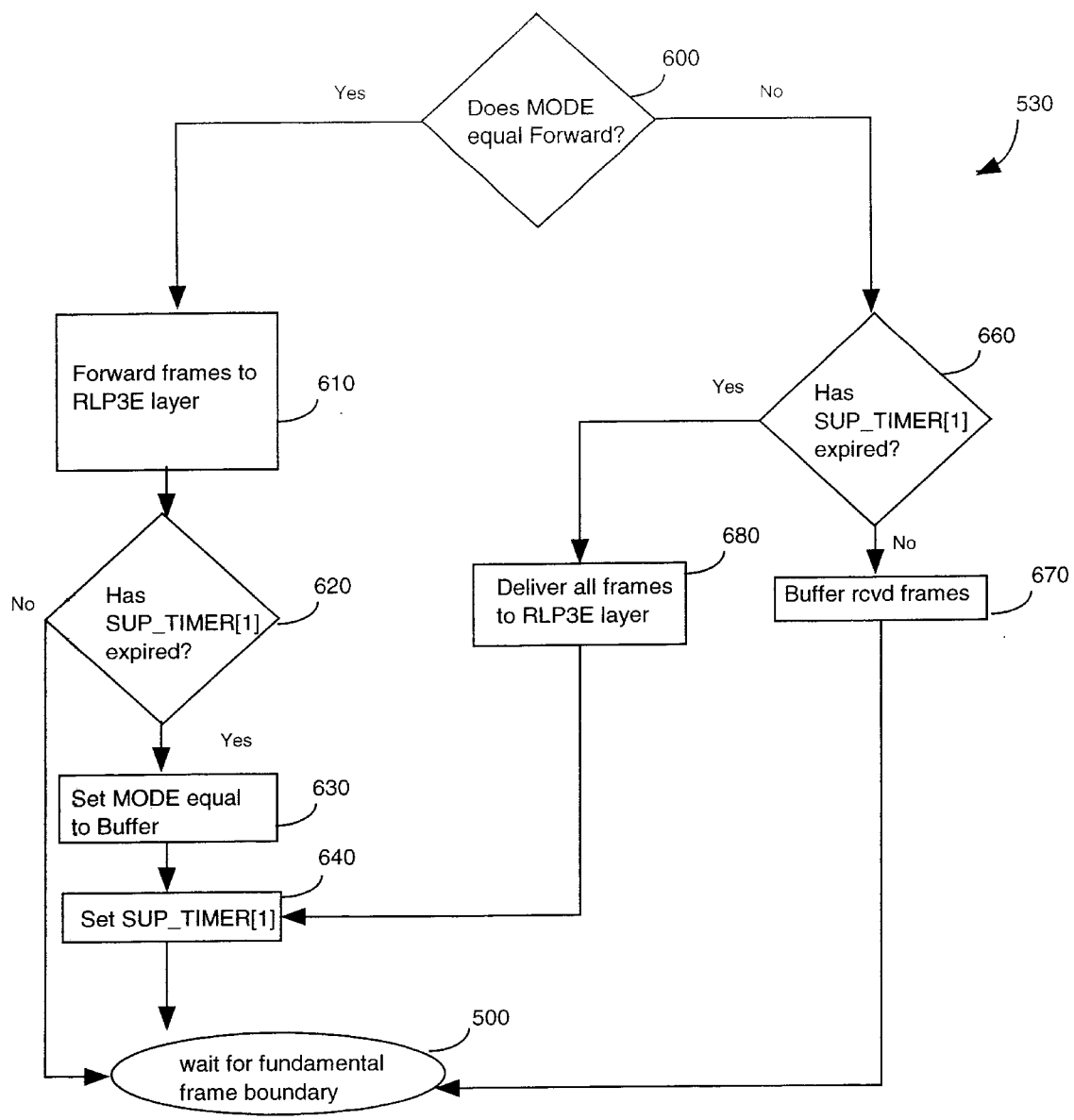
FIG. 6 is a flowchart illustrating an exemplary embodiment of the single supplemental channel methodology of the present invention.
Figure 7:
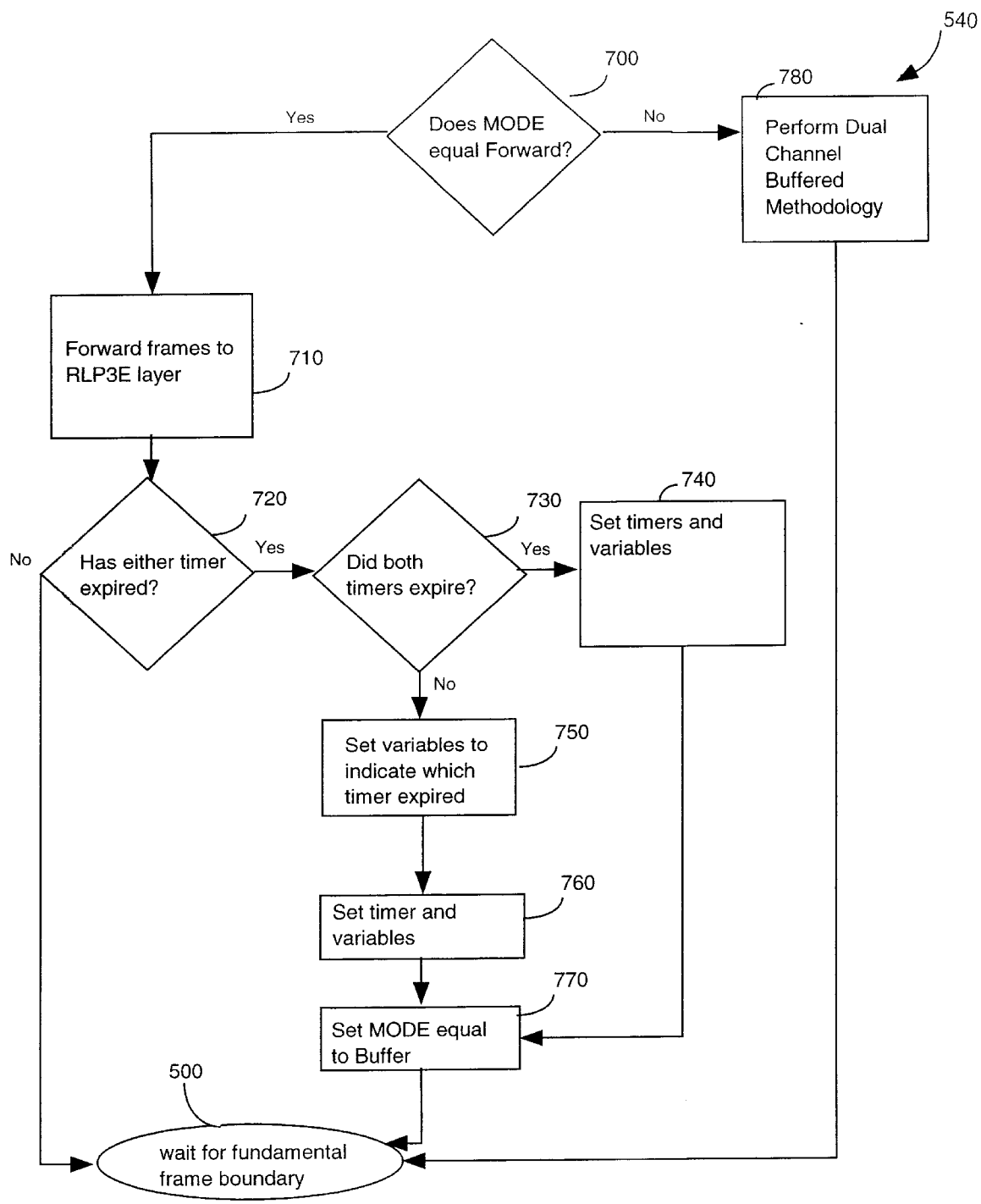
FIG. 7 is a flowchart illustrating an exemplary embodiment of the dual supplemental channel methodology of the present invention.
Figure 8:
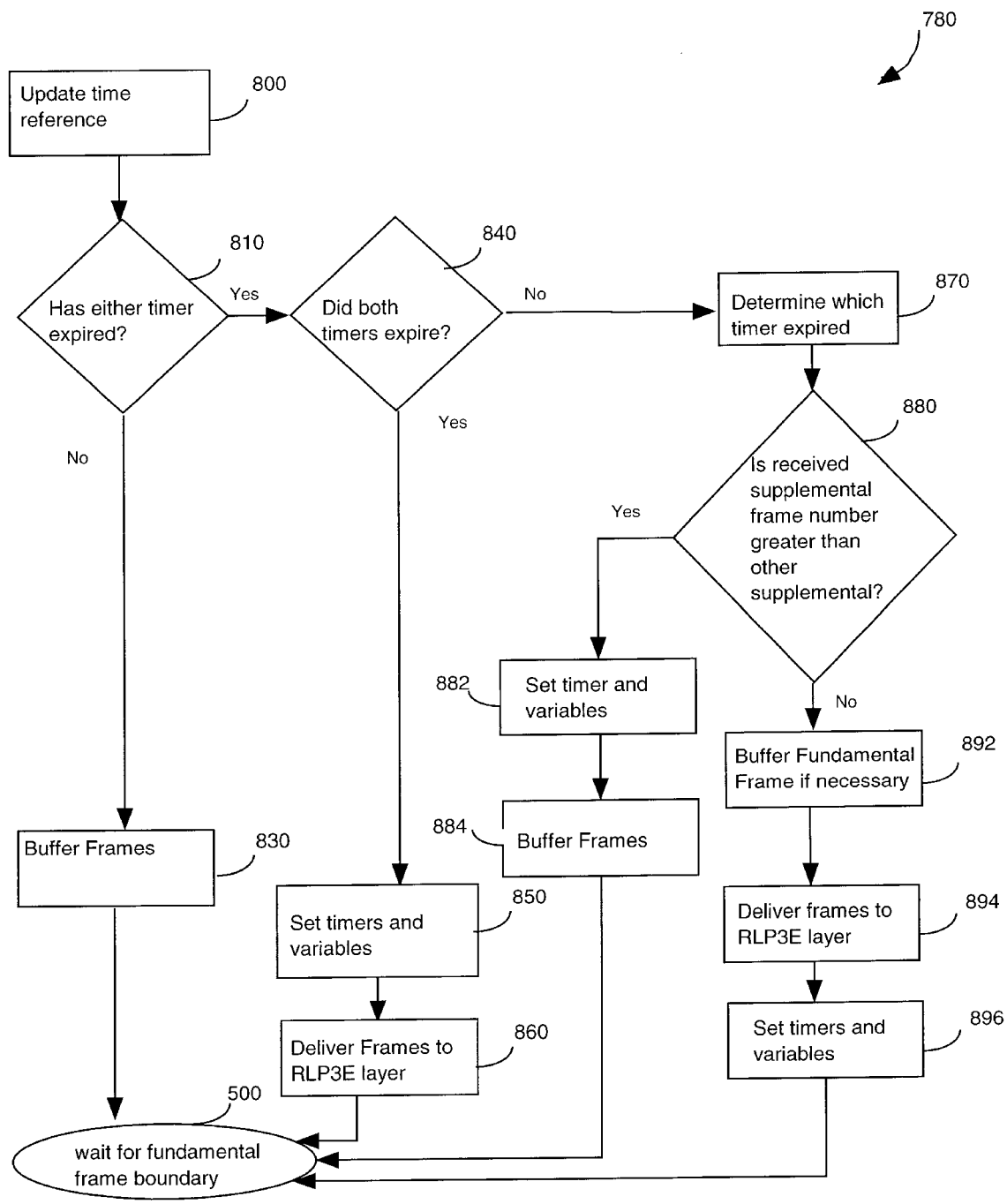
FIG. 8 is a flowchart illustrating an exemplary embodiment of the dual channel buffered methodology of the present invention.

In one embodiment, a flag, FUND_DELIVERY_OK, is set to TRUE to indicate that when the state machine first enters block 660 or block 780, described in reference to FIG. 6, FIG. 7, and FIG. 8, that a fundamental RLP3E frame received in block 502 during that interval should be forwarded to RLP3E layer 344.

In the exemplary embodiment, the variables and timers are initialized in block 420 as follows. A MODE variable is set to Forward, indicating that the frame reordering sublayer is in a mode in which it will forward all frames received from multiplex sublayer 348 to RLP3E layer 344. In the event that at least one supplemental channel is active, SUP_DURATION[1] is set to the CDMA frame duration negotiated for supplement channel 1 in block 410. The timer SUP_TIMER[1] is set so as to expire following the channel offset negotiated for supplemental channel 1. In the event that two supplemental channels are active, SUP_DURATION[2] is set to the CDMA frame duration negotiated for supplement channel 2 in block 410. A second timer SUP_TIMER[2] is set so as to expire following the channel offset negotiated for supplemental channel 2. In one embodiment, a flag, FUND_DELIVERY_OK, is set to TRUE to indicate that it a fundamental RLP3E frame received at the next 20 ms boundary should be forwarded to RLP3E layer 344. Additionally, variables SUP_FRAME_TXD[1] and SUP_FRAME_TXD[2] are set to NO_SUPS_TXD, indicating that base station 310 has not yet transmitted any frames on supplement channel 1 or on supplemental channel 2, respectively. Finally, in the event that two supplemental channels are active, SUP_DURATION[1] is compared with SUP_DURATION[2]. If SUP_DURATION[2] is greater than SUP_DURATION[1], then index L is set to 2 and index S is set to 1. Otherwise, index variable L is set to 1 and index variable S is set to 2. Thus, SUP_DURATION[L] returns the largest frame duration, while SUP_DURATION[S] returns the smallest frame duration, and SUP_TIMER[L] references the timer associated with the channel having the largest frame duration, while SUP_TIMER[S] references the timer associated with the channel having the smallest frame duration.

System time is used in the exemplary embodiment as the time reference for buffering frames and retrieving frames from the buffer. As is well known to those skilled in the art, in an alternative embodiment, the references to system time can be replaced with a variable that is used as a time reference with a granularity of at least 20 ms. For instance, in an alternative embodiment, a frame index variable, REL_TIME, can be used as a time reference for buffering frames and retrieving frames from the buffer. In an alternative embodiment that utilizes the variable REL_TIME, REL_TIME is initialized to 0 in block 420, and is later incremented by a fixed number, such as 1, each time the process moves to block 502.

Once the data service option is connected, data flow begins in block 360. Block 360 is further described in reference to FIG. 3.

The above description specifies an exemplary embodiment of the initialization of frame reordering sublayer 346. There are alternate embodiments in which variables L and S do not need to be stored. One such embodiment replaces each use of variable L with the return value of a call to a process which returns the index associated with the maximum of SUP_FRAME_DURATION[1] and SUP_FRAME_DURATION[2], and which replaces each use of variable S with the return value of a call to a process which returns the index associated with the minimum of SUP_FRAME_DURATION[1] and SUP_FRAME_DURATION[2].

Figure 5:
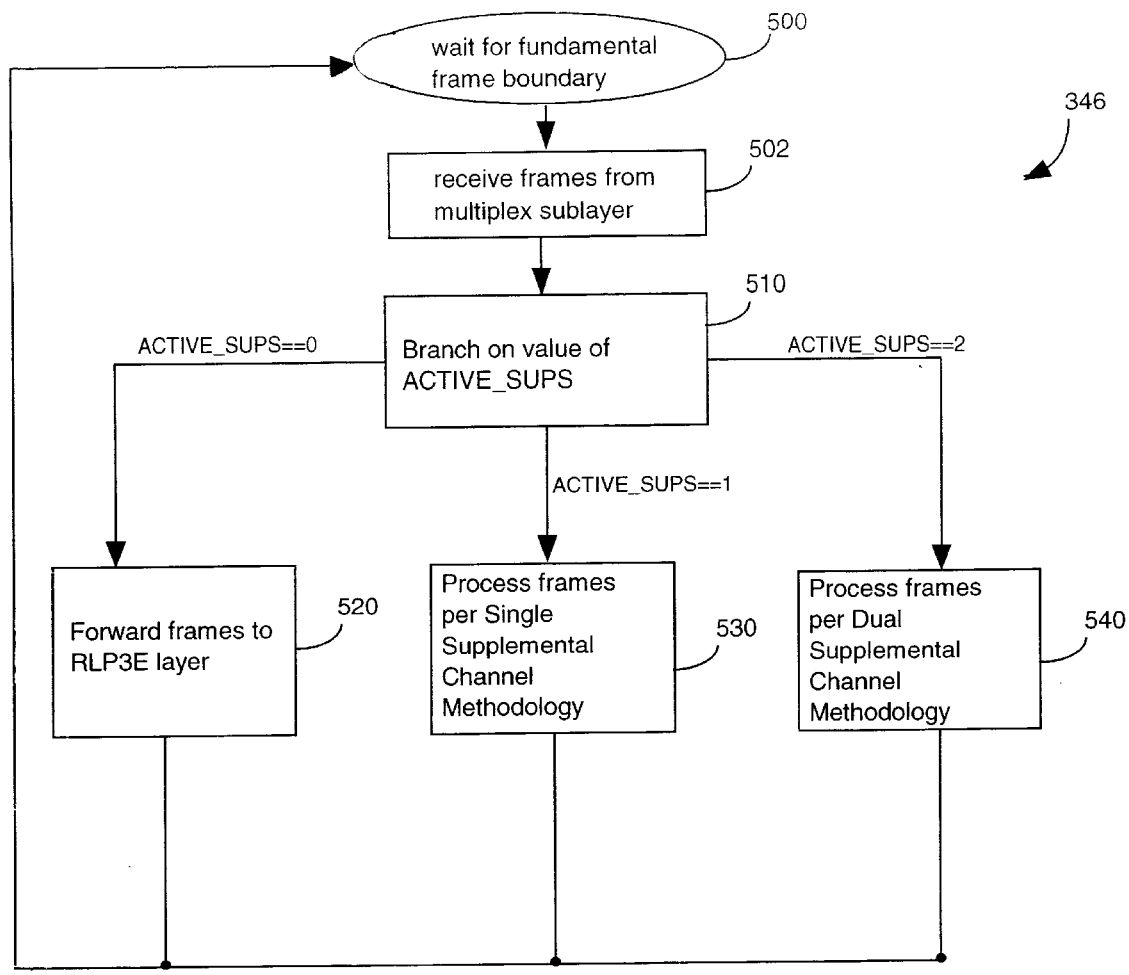
FIG. 5 is a high-level flowchart illustrating an exemplary embodiment of the method employed by the present invention to process received frames.

FIG. 5 is a flowchart illustrating the method employed by frame reordering layer 346 in the exemplary embodiment.

In block 500, the process waits for a fundamental channel frame boundary before proceeding further. In the exemplary embodiment, the process detects a 20 ms frame boundary each time multiplex sublayer 348 delivers a message to Frame Reordering Sublayer 346, containing the RLP3E frames that were received by multiplex sublayer 348 during a 20 ms period.

In an alternate embodiment, the RLP3E frames received by multiplex sublayer 348 are put in a data store accessible by frame reordering sublayer 346, after which a layer in communication with frame reordering sublayer 346 delivers a message to frame reordering sublayer 346 indicating that a 20 ms frame boundary has expired and that zero or more received RLP3E frames are accessible via the aforementioned data store. In this alternative embodiment, the layer in communication with sublayer 348 could be a timer subsystem, an interrupt subsystem, or any other subsystem or process in mobile station 340, which can accurately send a signal to frame reordering sublayer 346 after each 20 ms frame boundary.

In block 502, at each 20 ms boundary following the connection of a data service option, frame reordering sublayer 346 receives the RLP3E frames provided by multiplex sublayer 348 in step 500. The process then moves to block 510. As illustrated in block 510, a branch is made based upon the number of active supplemental channels.

If the number of active supplementals is 0, then the process moves to block 520. In block 520, all frames received are immediately forwarded to RLP3E Layer 344, because in a call without any active supplemental channels all frames are received in the same order in which they were transmitted. The process then moves to block 500, where the process will begin again at the end of the next 20 ms interval.

If the number of active supplementals is 1, then the process moves to block 530. In block 530, frame reordering sublayer 346 processes frames in accordance with the single supplemental methodology described with reference to FIG. 6.

If the number of active supplementals is 2, then the process moves to block 540. In block 540, frame reordering sublayer 346 process frames in accordance with the dual supplemental methodology described with reference to FIG. 5.

FIG. 6 is a flowchart illustrating an exemplary embodiment of the single supplemental channel methodology of the present invention. In block 600, the value of MODE is checked.

If MODE is equal to Forward at this point, the channel offset for supplemental channel 1 has yet to be reached, which indicates that base station 310 has yet to transmit any frames on supplemental channel 1. Thus, during this time period, because all frames must be received in the order in which they were transmitted, all received frames should be forwarded to the RLP3E layer. If the timer has expired, as illustrated as point 910 in FIG. 9A, it indicates that base station 310 is about to begin transmitting frames on supplemental 1. At such a point, the mode is switched to Buffer and the timer is reset to the frame duration of supplemental 1. In FIG. 9A, the timer next expires at time 140, as illustrated as point 920.

If, in block 600, MODE is equal to Forward, then all frames are forwarded to RLP3E layer 344 in block 610. The process then moves to control block 620 where it is checked whether SUP_TIMER[1] has expired. If the timer has not expired, then the process moves to block 500. Otherwise, if the timer has expired, then the process moves to block 630. In block 630, the mode is changed from Forward to Buffer. The process then moves to block 640 where SUP_TIMER[1] is set to the supplemental channel frame duration SUP_DURATION[1]. The process then moves to block 500.

If, in block 600, MODE does not equal. Forward, then the frames are buffered until the timer expires. This prevents received frames from being delivered to RLP3E layer 344 in such a way that unnecessary NAKs are generated. When the timer expires, as illustrated at points 920 and 930 of FIG. 9, all of the buffered frames can be delivered to RLP3E layer 344 without generating any unnecessary NAKS. For example, at point 920, CDMA frames containing RLP sequence numbers 3 through 7 have all been received. As these are consecutive sequence numbers, no NAKS will be generated unnecessarily. As well, at point 915, the point that is at the next 20 ms boundary after the timer expires at point 920, frame containing RLP sequence number 4 can be forwarded without generating an unnecessary NAK. However, if the frames had been delivered at a time between points 915 and 920, then a NAK would have been generated unnecessarily for frame RLP frame 4. Once the frames are delivered, the timer is reset to indicate when the next frame will be received on the supplemental channel.

Additionally, in one embodiment, a flag, FUND_DELIVERY_OK, is checked. In such an embodiment, if a fundamental RLP3E frame was received in step 502, and the value of FUND_DELIVERY_OK is TRUE, then the fundamental RLP3E frame is delivered to RLP3E layer 344 and is not buffered. In such an embodiment, FUND_DELIVERY_OK is then set to TRUE if the timer, SUP_TIMER[1], expired during this interval, and is set to FALSE otherwise. If, in block 600, MODE does not equal Forward, the process moves to block 660, where it is checked whether timer SUP_TIMER[1] has expired. If SUP_TIMER[1] has not expired, then the process move to block 670 where the received frames are placed in a memory buffer.

In an alternative embodiment, the value of FUND_DELIVERY_OK is checked. If FUND_DELIVERY_OK is set to FALSE, then the received frames are placed in a memory buffer. If, however, variable FUND_DELIVERY_OK has a value of TRUE, and a fundamental RLP3E frame was received during this 20 ms interval, then that frame is forwarded to RLP3E layer 344, while any received supplemental frames are buffered and the value of FUND_DELIVERY_OK is reset to FALSE. The process then moves from block 670 to block 500.

If it is determined, in block 660, that SUP_TIMER[1] has expired, then the process moves to block 680. In block 680, all of the frames are removed from the memory buffer and are forwarded to RLP3E layer 344. Additionally, in block 680 the frames received, in step 502, during the current 20 ms interval are also forwarded to RLP3E layer 344. In an alternative embodiment, the value of variable FUND_DELIVERY_OK is set to TRUE. The process then moves to block 640 where SUP_TIMER[1] is set to the supplemental channel CDMA frame duration SUP_DURATION[1]. The process then moves to block 500.

Figure 11:
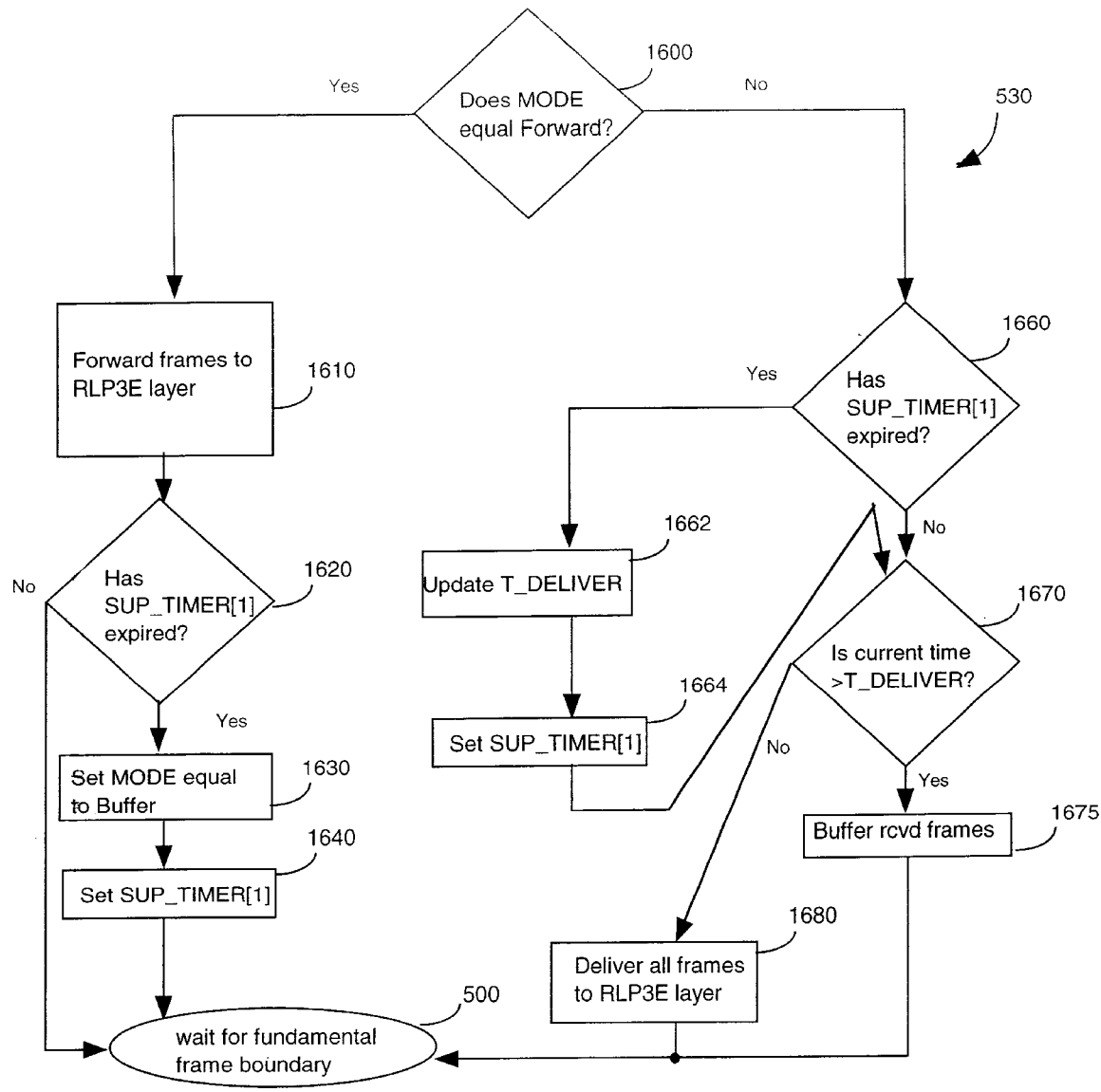
FIG. 11 illustrates a preferred embodiment of the operation described in FIG. 6.

FIG. 11 illustrates a preferred embodiment of the operation described in FIG. 6. Turning to FIG. 11, if, in block 1600, MODE is equal to Forward, then all frames received from multiplex sublayer 348 are forwarded to RLP3E layer 344 in block 1610. The process then moves to control block 1620 where it is checked whether SUP_TIMER[1] has expired. If the timer has not expired, then the process moves to block 500. Otherwise, if the timer has expired, then the process moves to block 1630. In block 1630, the mode is changed from Forward to Buffer. Additionally, in this preferred embodiment, a variable, T_DELIVER, is set to the value of the current time reference plus 20 ms. This will be used to indicate that the fundamental frame received during the next period should be forwarded to RLP3E layer 344. The process then moves to block 1640 where SUP_TIMER[1] is set to supplemental channel frame duration SUP_DURATION[1]. The process then moves to block 500.

If, in block 1600, MODE does not equal Forward, then the frames are buffered until the timer expires. Only after the timer expires, are all buffered frames, as well as the frame(s) received at the next 20 ms boundary, forwarded to RLP3E layer 344. This prevents received frames from being delivered to RLP3E layer 344 in such a way that unnecessary NAKs are generated. When the timer expires, as illustrated at points 920 and 930 of FIG. 9, all of the buffered frames can be delivered to RLP3E layer 344 without generating any unnecessary NAKS. For example, at point 920, CDMA frames containing RLP sequence numbers 3 through 7 have all been received. As these are consecutive sequence numbers, no NAKS will be generated unnecessarily. As well, at point 915, the point that is at the next 20 ms boundary after the timer expires at point 920, frame containing RLP sequence number 4 can be forwarded without generating an unnecessary NAK. However, if the frames had been delivered at a time between points 915 and 920, then a NAK would have been generated unnecessarily for frame RLP frame 4. Once the frames are delivered, the timer Is reset to indicate when the next frame will be received on the supplemental channel.

If, in block 1600, MODE does not equal Forward, then the frames are buffered until the timer expires. Only after the timer expires, are all buffered frames, as well as the frame(s) received at the next 20 ms boundary, forwarded to RLP3E layer 344. This prevents received frames from being delivered to RLP3E layer 344 in such a way that unnecessary NAKs are generated. When the timer expires, as illustrated at points 920 and 930 of FIG. 9, all of the buffered frames can be delivered to RLP3E layer 344 without generating any unnecessary NAKS. For example, at point 920, CDMA frames containing RLP sequence numbers 3 through 7 have all been received. As these are consecutive sequence numbers, no NAKS will be generated unnecessarily. As well, at point 915, the point that is at the next 20 ms boundary after the timer expires at point 920, frame containing RLP sequence number 4 can be forwarded without generating an unnecessary NAK. However, if the frames had been delivered at a time between points 915 and 920, then a NAK would have been generated unnecessarily for frame RLP frame 4. Once the frames are delivered, the timer is reset to indicate when the next frame will be received on the supplemental channel.

If, in block 1600, MODE does not equal Forward, the process moves to block 1660. In block 1600, it is determined whether SUP_TIMER[1] has expired. If the SUP_TIMER[1] has expired, the process moves to block 1662. In block 1662, the variable T_DELIVER is set to the value of the current time reference plus 20 ms. The process then moves to block 1664, where SUP_TIMER[1] is set to the supplemental channel frame duration SUP_DURATION[1]. The process then moves to block 1670.

In block 1660, if it is determined that SUP_TIMER[1] has not expired, the process moves to block 1670.

In block 1670, it is determined whether the value of the current time reference is greater than the value of T_DELIVER. If the current time reference is greater than the value of T_DELIVER, then the process moves to block 1675, where the received frames are buffered into a memory area. The process then moves to block 500.

If, in block 1670, it is determined that the current time reference is not greater than the value of T_DELIVER, then the process moves to block 1680. In block 1680, all of the frames are removed from the memory buffer and are forwarded to RLP3E layer 344 along with the frame(s) received from multiplex sublayer 348 during the current period. The process then moves to block 500.

FIG. 7 is a flowchart illustrating an exemplary embodiment of the dual supplemental channel methodology of the present invention. In control block 700, the value of MODE is checked.

If MODE is not equal to Forward, then MODE equals Buffer and the process moves to block 780 as is further described in reference to FIG. 8. If, conversely, MODE is equal to Forward, then the process moves to block 710.

If MODE is equal to Forward in block 710, the channel offset for supplemental channel 1 has yet to be reached, indicating that base station 310 has yet to transmit any frames on supplemental channel 1. In such a case, because all frames must be received in the order in which they were transmitted, all received frames are immediately forwarded to the RLP3E layer. When either or both timers expire, base station 310 is about to begin transmitting frames on the supplemental channel associated with each timer that has expired. As an example, at point 960 of FIG. 9B, the timer associated with supplemental channel 1 expires, indicating that base station 310 is about to begin transmitting frames on supplemental channel 1.

Whenever MODE equals Forward and one or more of the channel timers expire, MODE is switched to Buffer. In such a case, each expired timer is then set to the duration of the supplemental channel associated with it. Counters are initialized to denote the time at which frames began transmission on supplemental channel(s) associated with the timer(s) that expired. And, counters are initialized to keep track of the relative sequence numbers that were transmitted on the supplemental channel(s) associated with timer(s) that expired. The term 'relative sequence numbers' is used to indicate that the receiving entity need not track the absolute count of the actual sequence numbers transmitted on each channel. Rather, the receiving entity need only track the relationship of the RLP sequence numbers encapsulated in the last frame transmitted on each supplemental channel. In particular, the receiving entity needs to keep track of whether the sequence number of the RLP3E frame being transmitted on one supplemental channel is less than or greater than the sequence number of the RLP3E frame being transmitted on the other supplemental channel. In an alternative embodiment, a variable, T_DELIVER, is set to the value of the current time reference plus 20 ms. This will be used in an alternative embodiment to indicate that a fundamental RLP3E frame received at the next interval should be forwarded to RLP3E layer 344.

In the event that only one timer has expired, it is recorded that a supplemental frame has only begun transmission on the channel associated with that timer. If both timers expire, as previously described, the supplemental channel with the smaller duration is assigned a lower sequence number when two frames are transmitted at the same time. In such a case, it is recorded that the sequence number encapsulated in the frame being generated on the supplemental with the larger duration is of a relatively larger value than the RLP sequence number encapsulated in the frame being generated on the other supplemental channel.

As an example of the above, at point 960 in FIG. 9B, the mode would switch from Forward to Buffer and the timer associated with supplemental channel 1 would be set to 80 ms. Additionally, counters are initialized to keep track of the fact that a frame is about to be transmitted on supplemental 1 at the current time and no frame has yet to be transmitted on supplemental 2.

In block 710, all frames are removed from the buffer and forwarded to RLP3E layer 344. The process then moves to block 720, where it is determined whether either timer, SU_TIMER[1] or SU_TIMER[2], has expired. If neither timer has expired, then the process moves to block 500. In the event that only one of the timers expired, the process moves from block 730 to block 750. In block 750, it is determined whether SUP_TIMER[1] or SUP_TIMER[2] expired. If it is determined that SUP_TIMER[1] expired, then index variable E is set to 1 and index variable N is set to 2. Otherwise, E is set to 2 and N is set to 1. E is used as a reference to the timer, the duration, and the last transmit-time associated with the channel for which the timer has expired. N is used as a reference to the last transmit-time associated with the channel for which the timer has not yet expired. The process, then, moves to block 760.

In block 760, a single timer and multiple variables are set utilizing the E and N indexes determined in block 750. The variable SUP_FRAME_TXD[E] is set equal to 1, denoting that the first supplemental frame was transmitted on supplemental channel E. The variable SUP_FRAME_TXD[N] is set equal to a value equal to one greater than the maximum number of frames that can be transmitted on the fundamental channel in the maximum allowable supplemental channel offset. In the exemplary embodiment, the maximum allowable supplemental channel offset is 60 ms and a fundamental frame duration is 20 ms. Therefore, in the exemplary embodiment, SUP_FRAME_TXD[N] is set to 4 (1+(60/20)). This allows any frames received on supplemental E prior to the expiration of SUP_TIMER[N] to be immediately delivered to RLP3E layer 344. In an alternative embodiment, SUP_FRAME_TXD[N] or another flag can be set to a reserved value, such as, negative 1 or NULL, to indicate that supplemental channel N has yet to begin transmission of any frames. In the preferred embodiment, SUP_FRAME_TXD[N] is set to −1 (negative one) to indicate that supplemental channel N has yet to begin transmission of any frames. Also, the variable SUP_FRAME_TX_TIME[E] is set equal to 1 to denote a time reference to the time at which the current frame transmission began on supplemental E. In a preferred embodiment, a variable, T_DELIVER, is set equal to the value of the current time reference plus 20 ms, indicating that a fundamental RLP3E frame received at the next interval should be forwarded to RLP3E layer 344.

In block 760, timer SUP_TIMER[E] is set to SUP_DURATION[E]. Thus, SUP_TIMER[E] will expire as soon as the transmission of the frame being transmitted on supplemental E finishes.

The process then moves from block 760 to block 770. In block 770 the mode is switched from Forward to Buffer, after which the process moves to block 500. In block 730, if it is determined that both timers have expired, the process moves to block 740. In block 740, multiple variables and timers are set to track when frames are being transmitted by base station 310. In block 740, variables are set utilizing the S and L indices determined in block 410.

In the exemplary embodiment of block 740, the variable SUP_FRAME_TXD[S] is set equal to 1, denoting that the RLP3E frame with the smaller sequence number is about to be transmitted on supplemental channel S. The variable SUP_FRAME TXD[L] is set equal to 2, denoting that the RLP3E frame with the larger number is about to be transmitted on supplemental channel L. Although the frame transmitted on supplemental L is transmitted at the same time as the frame on supplemental S, the methodology of the present invention requires that SUP_FRAME_TXD[S] be set to a lower number than SUP_FRAME_TXD[L] to prevent the frame with the larger RLP sequence number from being delivered to RLP3E layer 344 prior to the frame with the smaller sequence number. This is in accordance with the requirement placed on the transmitting RLP3E layer 314 discussed in reference to FIG. 3.

The variable SUP_FRAME_TX_TIME[S] is set equal to the value of the current time reference to the time at which the current frame transmission began on supplemental S. And the variable SUP_FRAME_TX_TIME[L] is set equal to the current time reference to denote a time reference to the time at which the current frame transmission began on supplemental L. In an alternative embodiment, a variable, T_DELIVER, is set equal to the value of the current time reference plus 20 ms, indicating that a fundamental RLP3E frame received at the next interval should be forwarded to RLP3E layer 344.

In the exemplary embodiment of block 740, timer SUP_TIMER[S] is set to SUP_DURATION[S] and timer SUP_TIMER[L] is set to SUP_DURATION[L]. Thus, timer SUP_TIMER[S] will expire as soon as the transmission of the frame being transmitted on supplemental S finishes. Additionally, timer SUP_TIMER[L] is set to SUP_DURATION[L]. Thus, SUP_TIMER[L] will expire as soon as the transmission of the frame being transmitted on supplemental L finishes.

The process moves to block 770, described earlier, after which the process moves to block 500.

In block 700, if it is determined that the MODE does not equal Forward, then the process moves to block 780 which is described in FIG. 8.

FIG. 8 is a flowchart illustrating an exemplary embodiment of the dual channel buffered methodology of the present invention.

In block 810, MODE equals Buffer. When MODE equals Buffer, all frames are buffered until either timer expires.

If neither timer expires, the alternate embodiment which uses a flag, FUND_DELIVERY_OK, to denote whether a received fundamental frame can be delivered in a given period, an exception is accordingly made. In this alternate embodiment, if during a given period neither timer has expired, and FUND_DELIVERY_OK is set to true, a received fundamental is immediately forwarded to RLP3E layer 344. In this alternate embodiment FUND_DELIVERY_OK is set to false during each period in which neither timer has expired.

In a preferred embodiment, in a period in which a timer has not expired, the value of T_DELIVER is compared against the current time reference. In such a case, if the value of the current time reference is not greater than T_DELIVER, then if a fundamental RLP3E frame is received, it is immediately delivered to RLP3E layer 344.

Whenever a timer expires, it is determined which frames are to be removed from the buffer and forwarded to RLP3E layer 344. Buffering the frames until a timer expires prevents received frames from being delivered to RLP3E layer 344 in such a way that unnecessary NAKs are generated. For example, at point 970 of FIG. 9B, frames 0,1, and 3 had been received. If they had not been buffered, RLP3E layer 344 would have generated a NAK for frame 2. Unlike single supplemental methodology 530, when a single timer expires in the dual channel buffered methodology, only select frames can be forwarded to RLP3E layer 344 without causing the unnecessary generation of NAKs. For example, at point 980 of FIG. 9B, the timer associated with supplemental channel 1 expires. The received frames, at this point, contain sequence numbers 0,1,3,4,6, and 2. Thus, although it is desirable to forward to RLP3E layer 344 all frames having sequence numbers less than 5, it is undesirable to forward frame 6 to RLP3E layer 344, as this would cause the generation of an unnecessary NAK for frame 5. The method of the present invention succeeds in forwarding to RLP3E layer 344 the desired and only the desired frames.

In the dual channel buffered methodology, it is determined whether one or both timers expired at the same time. If one timer is still running when the other expires, as illustrated at points 970, 980, and 985, of FIG. 9B, and is illustrated at points 1020,1030, and 1040, of FIG. 10, the following methodology is used.

If it is determined that both timers expired at the same time, as is illustrated in point 990 of FIG. 9B, then all received frames and all buffered frames are forwarded to RLP3E layer 344. For example, at point 990, in FIG. 9B, all received and buffered frames are forwarded to the RLP3E layer. Additionally, each expired timer is set to the frame duration of the supplemental channel associated with it. It is recorded that the sequence number encapsulated in the frame being generated on the supplemental with the larger duration Is of a relatively larger value than the RLP sequence number encapsulated in the frame being generated on the other supplemental channel. Additionally, in one embodiment a flag, FUND_DELIVERY_OK, Is set to TRUE, indicating that a fundamental RLP3E frame received at the next 20 ms boundary should be forwarded to RLP3E layer 344. In an alternative embodiment, a variable, T_DELIVER, is set equal to the value of the current time reference plus 20 ms, indicating that a fundamental RLP3E frame received at the next interval should be forwarded to RLP3E layer 344. In a system in which both supplementals are guaranteed to have the same frame duration, when exactly one timer expires, the frame in transmit on the other supplemental will contain an RLP sequence number that is greater than the one contained in the supplemental frame just received. Thus, in a system in which both supplementals have the same frame duration, the dual buffered methodology can be simplified to the following alternate embodiment. Each time exactly one timer expires, forward all frames to the RLP3E layer which were received on or before 20 milliseconds after the last frame transmission began on the other supplemental.

Figure 10:
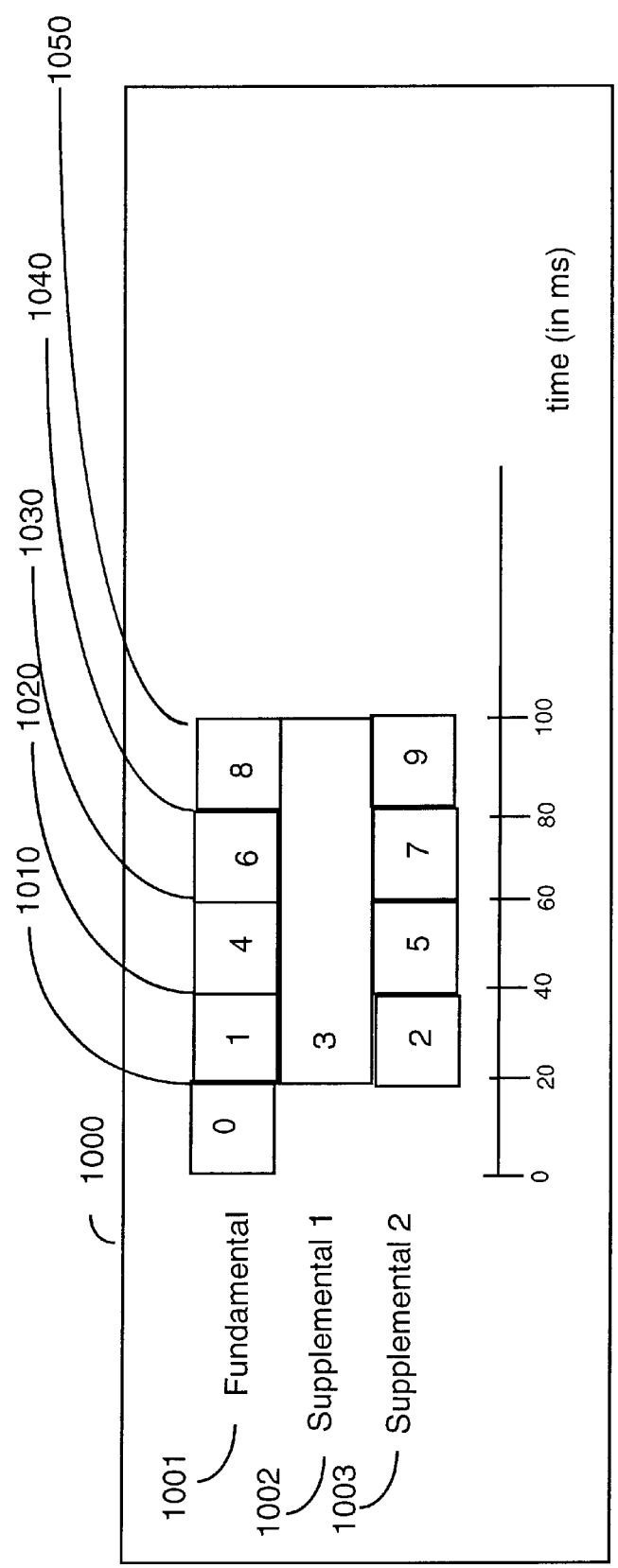
FIG. 10 is an a timeline diagram illustrating alternate timing at which various RLP frames are transmitted in an exemplary cdma2000-like system in which there are two active supplemental channels.

As an example of the dual buffered methodology in which both supplemental timers expire at the same time, at point 1030, in FIG. 10, frames 4 and 5 would both be buffered. As a second example, at point 1040, frames 6 and 7 would both be buffered.

If, however, it is determined that the sequence number last transmitted on the supplemental channel associated with the expired timer is less than the sequence number last transmitted on the other supplemental channel, or that no other frame has begun transmission on the other supplemental channel, then the following methodology is used. The frame received on the supplemental channel is forwarded to RLP3E layer 344 along with all buffered frames received on or before 20 milliseconds after the last frame transmission began on the other supplemental channel. If the current time is not greater than 20 milliseconds after the last frame transmission began on the other supplemental channel, then the current fundamental frame received is also forwarded to RLP3E layer 344, otherwise the current fundamental frame is buffered.

As an example of the above methodology, at point 980, in FIG. 9B, frames that were received before or on time 80 (60+20) would be forwarded to the RLP3E layer. Likewise, at point 985, frames that were received before or on time 120 (100+20) would be forwarded to the RLP3E layer. Additionally, the expired timer is set to the frame duration of the supplemental channel associated with it, and it is recorded that a frame is about to begin transmission on the channel associated with the expired timer, and that the frame about to begin transmission on this supplemental will contain an RLP sequence number greater than the frame which already began transmission on the other supplemental channel.

If it is determined that both timers expired at the same time, as is illustrated in point 990 of FIG. 9B, then all received frames and all buffered frames are forwarded to RLP3E layer 344. For example, at point 990, in FIG. 9B, all received and buffered frames are forwarded to the RLP3E layer. Additionally, each expired timer is set to the frame duration of the supplemental channel associated with it. It is recorded that the sequence number encapsulated in the frame being generated on the supplemental with the larger duration is of a relatively larger value than the RLP sequence number encapsulated in the frame being generated on the other supplemental channel. Additionally, in one embodiment a flag, FUND_DELIVERY_OK, is set to TRUE, indicating that a fundamental RLP3E frame received at the next 20 ms boundary should be forwarded to RLP3E layer 344. In an alternative embodiment, a variable, T_DELIVER, is set equal to the value of the current time reference plus 20 ms, indicating that a fundamental RLP3E frame received at the next interval should be forwarded to RLP3E layer 344. In a system in which both supplementals are guaranteed to have the same frame duration, when exactly one timer expires, the frame in transmit on the other supplemental will contain an RLP sequence number that is greater than the one contained in the supplemental frame just received. Thus, in a system in which both supplementals have the same frame duration, the dual buffered methodology can be simplified to the following alternate embodiment. Each time exactly one timer expires, forward all frames to the RLP3E layer which were received on or before 20 milliseconds after the last frame transmission began on the other supplemental.

In block 810, it is determined whether either timer has expired. If neither timer has expired, the process moves to block 830. In block 830, all frames received from multiplex sublayer 348 are buffered into memory and are associated in the buffer memory with the value of the current time reference. Additionally, in an alternative embodiment, a flag, FUND_DELIVERY_OK, is checked. In such an embodiment, if a fundamental RLP3E frame was received in step 502, and the value of FUND_DELIVERY_OK is TRUE, then the fundamental RLP3E frame is delivered to RLP3E layer 344 and is not buffered. In such an embodiment, FUND_DELIVERY_OK is then set to a value of FALSE. The process then moves to block 500.

In block 810, if either one of the timers has expired, then the process moves to block 840, where it is checked whether both timers expired. If both timers expired, then the process moves to block 850. In block 850 multiple variables and timers are set to track when frames are being transmitted by base station 310.

In block 850, variables are set as follows. The variable SUP_FRAME_TXD[S] is set equal to 1 and the variable SUP_FRAME_TXD[L] is set equal to 2, denoting that the sequence number associated with the supplemental channel having the largest duration is larger than the sequence number associated with the supplemental channel having the smaller duration. The variables SUP_FRAME_TX_TIME [S] and SUP_FRAME_TX_TIME[L] are both set to the value of the current time reference, denoting the time reference at which the current frame transmissions began on the two supplemental channels. Additionally, timer SUP_TIMER[S] is set to SUP_DURATION[S], and timer SUP_TIMER[L] is set to SUP_DURATION[L]. Thus, timer SUP_TIMER[S] will expire as soon as the transmission of the frame being transmitted on supplemental S finishes, and timer SUP_TIMER[L] will expire as soon as the transmission of the frame being transmitted on supplemental L finishes. In an alternative embodiment, the value of FUND_DELIVERY_OK is set to TRUE. The process then moves to block 860.

In block 860, all frames that were buffered are forwarded (and removed from the buffer) to RLP3E layer 344 along with the frames received during the current 20 ms period. The process then moves to block 500. In block 840, if it is determined that only one timer expired, the process moves to block 870. In block 870, it is determined whether SUP_TIMER[1] or SUP_TIMER[2] expired. If it is determined that SUP_TIMER[1] expired, then E is set to 1 and N is set to 2. Otherwise, E is set to 2 and N is set to 1. Thus, the index E is associated with the channel for which the timer expired, while N is associated with the channel for which the timer did not expire.

In block 880 it is checked whether the value in variable SUP_FRAME_TXD[E] is greater than the value in variable SUP_FRAME_TXD[N]. If the value in SUP_FRAME_TXD[E] is greater than SUP_FRAME_TXD [N], or the value of SUP_FRAME_TXD[N] is set to NO_SUPS_TXD, it indicates that the frame received on the supplemental contains a greater RLP sequence number than the frame in transit on the other supplemental. In such a case, the process moves to block 882. In block 882, SUP_FRAME_TX_TIME[E] is set to the value of the current time reference to indicate that a new frame is about to be transmitted on the channel associated with the timer that just expired. Additionally, the timer, SUP_TIMER[E], is set to SUP_DURATION[E]. Thus, SUP_TIMER[E] will expire as soon as the transmission of the next frame finishes. The process then moves to block 884. In block 884, all frames received from multiplex sublayer 348 are buffered into a memory area and are associated in the buffer memory with the value of the current time reference. The one exception to this rule occurs in the embodiment that uses a flag, FUND_DELIVERY_OK, to denote whether a received fundamental frame can be delivered in a given period. In such a case, if FUND_DELIVERY_OK is set to TRUE. In such a case, although the supplemental frame is buffered, the fundamental RLP3E frame is immediately delivered to RLP3E layer 344, FUND_DELIVERY_OK is reset to FALSE. The process then moves to block 500.

If, in block 880, it is determined that the value in SUP_FRAME_TXD[E] is not greater than SUP_FRAME_TXD[N], it indicates that the frame received on the supplemental contains a lower RLP sequence number than the frame in transit on the other supplemental. In such a case, the process moves to block 892. In block 892, if a fundamental frame was received during this interval, the fundamental frame is buffered. In an alternative embodiment, the fundamental frame is only buffered if the value of the current time reference is greater than SUP_FRAME_TX_TIME[N]+20 ms, thus saving the step of buffering the frame only to immediately remove the frame and forward it. The process moves from block 892 to block 894. In block 894, all buffered frames that were received at a time on or prior to the value In SUP_FRAME_TX_TIME[N]+20 ms, representing a time 20 ms after the supplemental frame currently in transit began transmission, are removed from the buffer and forwarded to RLP3E layer 344 along with the supplemental frame just received. In the embodiment which utilizes the variable FUND_DELIVERY_OK, the variable FUND_DELIVERY_OK Is reset to FALSE. The process moves to block 896.

In block 896, SUP_FRAME_TXD[E] is set to a value greater than SUP_FRAME_TXD[N], indicating that the frame about to begin transmission on the supplemental will contain an RLP sequence number greater than that contained in the frame already in transit on the other supplemental. SUP_FRAME_TX_TIME[E] is set to the value of the current time reference, system time in the exemplary embodiment, to indicate that a new frame is about to be transmitted on the channel associated with the timer that just expired. Additionally, the timer, SUP_TIMER[E], is set to SUP_DURATION[E]. Thus, SUP_TIMER[E] will expire as soon as the transmission of the next frame finishes. The process then moves to block 500.

Figure 12:
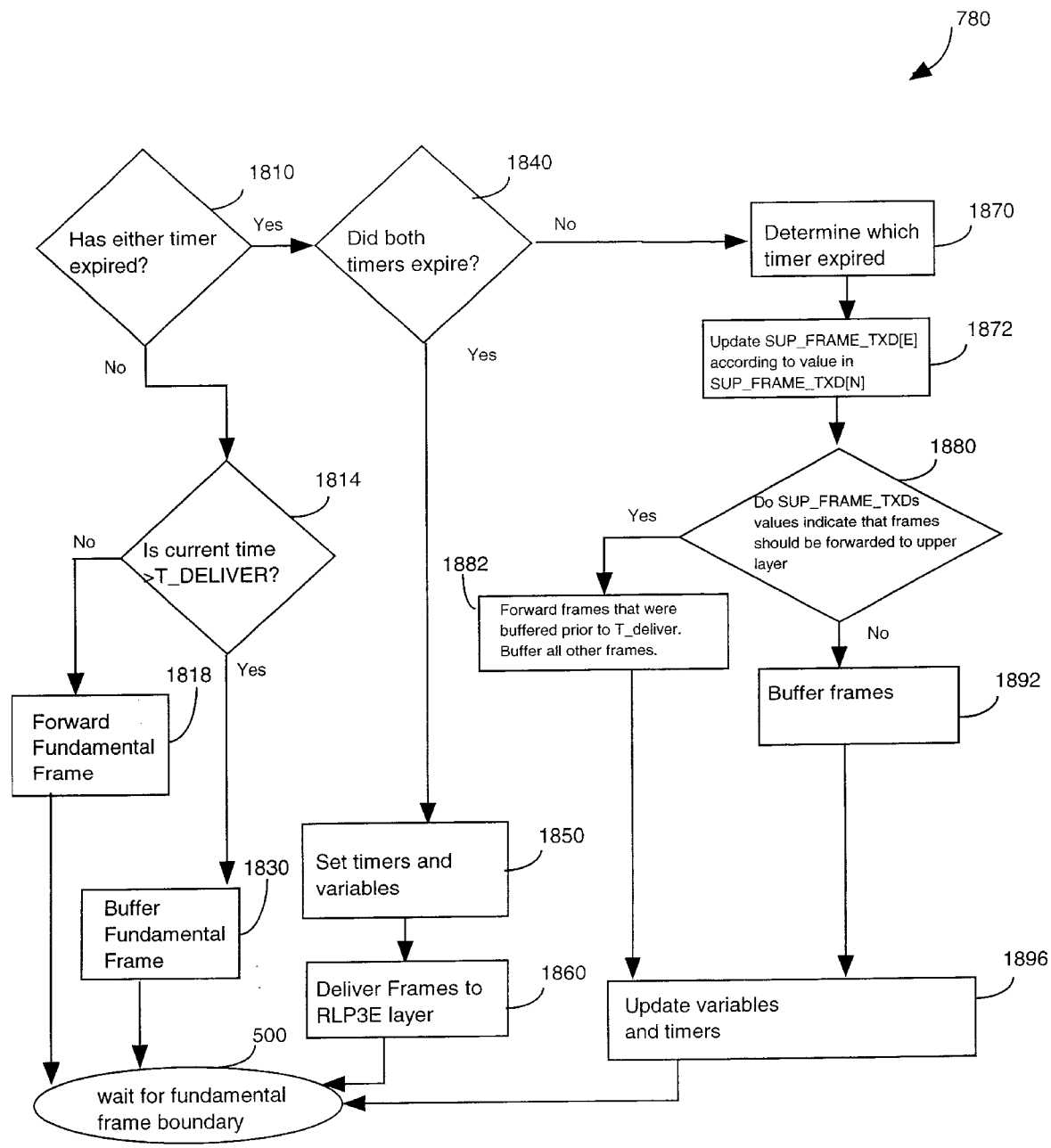
FIG. 12 illustrates a preferred embodiment of the operation described in FIG. 8.

FIG. 12 illustrates a preferred embodiment of the operation described in FIG. 8. Turning to FIG. 12, in block 1810, MODE equals Buffer. It is desired to buffer all frames that come in at a time which is greater than the value stored in T_DELIVER, and to deliver all frames that arrived at a time which is less than the value stored in T_DELIVER.

Whenever a timer expires, it is determined which frames are to be removed from the buffer and forwarded to RLP3E layer 344. Buffering the frames until a timer expires prevents received frames from being delivered to RLP3E layer 344 in such a way that unnecessary NAKs are generated. For example, at point 970 of FIG. 9B, frames 0, 1, and 3 had been received. If they had not been buffered, RLP3E layer 344 would have generated a NAK for frame 2. Unlike single supplemental methodology 530, when a single timer expires in the dual channel buffered methodology, only select frames can be forwarded to RLP3E layer 344 without causing the unnecessary generation of NAKs. For example, at point 980 of FIG. 9B, the timer associated with supplemental channel 1 expires. The received frames, at this point, contain sequence numbers 0,1,3,4,6, and 2. Thus, although it is desirable to forward to RLP3E layer 344 all frames having sequence numbers less than 5, it is undesirable to forward frame 6 to RLP3E layer 344, as this would cause the generation of an unnecessary NAK for frame 5. The method of the present invention succeeds in forwarding to RLP3E layer 344 the desired and only the desired frames.

In the dual channel buffered methodology, it is determined whether one or both timers expired at the same time. If one timer is still running when the other expires, as illustrated at points 970, 980, and 985, of FIG. 9B, and is illustrated at points 1020, 1030, and 1040, of FIG. 10, the following methodology is used.

First, the relative sequence numbers of the last transmitted frame on each channel are compared.

If it is determined that the sequence number last transmitted on the supplemental channel associated with the expired timer is greater than the sequence number last transmitted on the other supplemental channel, then the received frames are buffered, and the expired timer is set to the frame duration of the supplemental channel associated with it. In the preferred embodiment, the setting and comparison of the values associated with SUP_FRAME_TXD is done via unsigned modulo 8 arithmetic operations.

As an example of the dual buffered methodology in which both supplemental timers expire at the same time, at point 1030, in FIG. 10, frames 4 and 5 would both be buffered. As a second example, at point 1040, frames 6 and 7 would both be buffered.

If, however, it is determined that the sequence number last transmitted on the supplemental channel associated with the expired timer is less than the sequence number last transmitted on the other supplemental channel, or that no other frame has begun transmission on the other supplemental channel, then the following methodology is used. The frame received on the supplemental channel is forwarded to RLP3E layer 344 along with all buffered frames received on or before 20 milliseconds after the last frame transmission began on the other supplemental channel. If the current time is not greater than 20 milliseconds after the last frame transmission began on the other supplemental channel, then the current fundamental frame received is also forwarded to RLP3E layer 344, otherwise the current fundamental frame is buffered.

As an example of the above methodology, at point 980, in FIG. 9B, frames that were received before or on time 80 (60+20) would be forwarded to the RLP3E layer. Likewise, at point 985, frames that were received before or on time 120 (100+20) would be forwarded to the RLP3E layer. Additionally, the expired timer is set to the frame duration of the supplemental channel associated with it, and it is recorded that a frame is about to begin transmission on the channel associated with the expired timer, and that the frame about to begin transmission on this supplemental will contain an RLP sequence number greater than the frame which already began transmission on the other supplemental channel.

If it is determined that both timers expired at the same time, as is illustrated in point 990 of FIG. 9B, then all received frames and all buffered frames are forwarded to RLP3E layer 344. For example, at point 990, in FIG. 9B, all received and buffered frames are forwarded to the RLP3E layer. Additionally, each expired timer is set to the frame duration of the supplemental channel associated with it. It is recorded that the sequence number encapsulated in the frame being generated on the supplemental with the larger duration is of a relatively larger value than the RLP sequence number encapsulated in the frame being generated on the other supplemental channel. In the preferred embodiment, a variable, T_DELIVER, is set equal to the value of the current time reference plus 20 ms, indicating that a fundamental RLP3E frame received at the next interval should be forwarded to RLP3E layer 344.

In a system in which both supplementals are guaranteed to have the same frame duration, when exactly one timer expires, the frame in transmit on the other supplemental will contain an RLP sequence number that is greater than the one contained in the supplemental frame just received. Thus, in a system in which both supplementals have the same frame duration, the dual buffered methodology can be simplified to the following alternate embodiment. Each time exactly one timer expires, forward all frames to the RLP3E layer which were received on or before 20 milliseconds after the last frame transmission began on the other supplemental.

In block 1810, it is determined whether either timer, SUP_TIMER[1] or SUP_TIMER[2], has expired. If neither timer has expired, the process moves to block 1814. In block 1814, it is determined whether the current time reference is greater than T_DELIVER. If the current time reference is greater than value of T_DELIVER, the process moves to block 1830. In block 1830, the fundamental frame received during this period is buffered into memory and is associated in the buffer memory with the value of the current time reference. The process then moves to block 500.

In block 1814, if it is determined that the current time reference is less than or equal to the value of T_DELIVER, then the process moves to block 1818. In block 1818, the fundamental frame received during the period is forwarded to RLP3E layer 344. The process then moves to block 500.

In block 1810, if either one of the timers has expired, then the process moves to block 1840, where it is determined whether both timers expired. If both timers expired, then the process moves to block 1850. In block 1850 multiple variables and timers are set to track when frames are being transmitted by base station 310.

In block 1850, variables are set as follows. The variable SUP_FRAME_TXD[S] is set equal to 1 and the variable SUP_FRAME_TXD[L] is set equal to 2, denoting that the sequence number associated with supplemental channel having the largest duration is larger than the sequence number associated with the supplemental channel having the smaller duration. The variable T_DELIVER is set to the value of the current time reference plus 20 ms, denoting that all frames that arrive prior to time T_DELIVER should be forwarded to RLP3E layer 344. Additionally, timer SUP_TIMER[S] is set to SUP_DURATION[S], and timer SUP_TIMER[L] is set to SUP_DURATION[L]. Thus, timer SUP_TIMER[S] will expire as soon as the transmission of the frame being transmitted on supplemental S finishes, and timer SUP_TIMER[L] will expire as soon as the transmission of the frame being transmitted on supplemental L finishes. The process then moves to block 1860.

In block 1860, all frames that were buffered are forwarded (and removed from the buffer) to RLP3E layer 344 along with the frames received from multiplex sublayer 348 during the current 20 ms period. The process then moves to block 500.

In block 1840, if it is determined that only one timer expired, the process moves to block 1870. In block 1870, it is determined whether SUP_TIMER[1] or SUP_TIMER[2] expired. If it is determined that SUP_TIMER[1] expired, then E is set to 1 and N is set to 2. Otherwise, E is set to 2 and N is set to 1. Thus, the index E is associated with the channel for which the timer expired, while N is associated with the channel for which the timer did not expire. The process then moves to block 1872.

In block 1872, if it is determined that SUP_FRAME_TXD[N] has a value of −1, indicating that no data has been transmitted on supplemental channel N, then SUP_FRAME_TXD[E] is set to a value of 0. The process then moves to block 1880.

In block 1880, it is determined whether the value in SUP_FRAME_TXD[N] does not equal −1, and whether the value in SUP_FRAME_TXD[E] is greater than the value in SUP_FRAME_TXD[N]. If the value in SUP_FRAME_TXD[N] does not equal −1, indicating that a frame has begun transmission on supplemental channel N, and the value in SUP_FRAME_TXD[E] is greater than the value in SUP_FRAME_TXD[N], indicating that the sequence numbers in the frame received on channel E is greater than the sequence numbers in the frame yet to be received on channel N, then it is determined that no frames should be forwarded to the RLP3E layer during this period, and the process moves to block 1892. In block 1892, all RLP frames received from multiplex sublayer 348 are buffered into a memory area and are associated in the buffer memory with the value of the current time reference.

In block 1880, if it is determined either that SUP_FRAME_TXD[N] equals −1, indicating that no frames have begun transmission on supplemental channel N, or the value of SUP_FRAME_TXD[E] is less than the value of SUP_FRAME_TXD[N], indicating that the frame received on supplemental channel N has a sequence number that is lower than that currently being transmitted on supplemental channel E, then the process moves to block 1882, where the appropriate frames are buffered and the appropriate frames are forwarded to RLP3E layer 344.

In block 1882, if the current reference time is less than or equal to T_DELIVER, all of the frames are removed from the buffer memory and are forwarded to RLP3E layer 344 along with the frames received from multiplex sublayer 348 during the current period. In block 1882, if the current time reference is greater than T_DELIVER, all frames received from multiplex sublayer 348 during this period are buffered into memory and are associated in the buffer memory with the value of the current time reference. Additionally, all frames stored in the buffer memory, which are associated with a time less than or equal to T_DELIVER, are removed from the buffer memory and are forwarded to RLP3E layer 344. The process then moves to block 1896.

In block 1896, timer SUP_TIMER[E] is set to the value of SUP_DURATION[E]. Thus, SUP_TIMER[E] will expire as soon as the transmission of the frame being transmitted on supplemental E finishes. Additionally, T_DELIVER is set is set to the value of the current time reference plus 20 ms, denoting that all frames that arrive prior to time T_DELIVER should be forwarded to RLP3E layer 344. Lastly, SUP_FRAME TXD[E] is set to the value of: (SUP_FRAME_TXD[N]+1) modulo 8. The process then moves to block 500.

FIG. 9A is a timeline diagram illustrating the timing at which various RLP frames are transmitted in an exemplary cdma2000-like system in which there is one active supplemental channel. FIG. 9A illustrates a 220 ms time period in which CDMA frames containing RLP sequence numbers 0 through 12 are transmitted in an RLP3E data transmission system 900 consisting of a fundamental channel 901 and one supplemental channel 902. Supplemental channel 902 is configured to have a CDMA frame duration of 80 ms, and to have a 60 ms channel offset.

As illustrated, fundamental channel 901 transmits 20 ms CDMA frames containing RLP3E frames of sequence numbers 0,1,2,3,5,6,7,8,10, and 12. Supplemental channel 902 transmits 80 ms CDMA frames containing RLP3E frames of sequence numbers 4 and 9. As illustrated in FIG. 9A, frame 0 begins transmission at time 20 and finishes transmission at time 20.

At point 910, representative of the 60 ms supplemental channel offset, fundamental channel 901 finishes transmission of frame 2 (the frame containing RLP sequence number 2) and begins transmission of frame 3. Additionally, supplemental channel 902 begins transmission of frame 4.

At point 915, fundamental channel 901 finishes transmission of frame 3 and begins transmission of frame 5.

At point 920, fundamental channel 901 finishes transmission of frame 7, and begins transmission of frame 8. Additionally, supplemental channel 902 finishes transmission of frame 4 and begins transmission of frame 9.

At point 930, fundamental channel 901 finishes transmission of frame 12, and supplemental channel 902 finishes transmission of frame 9.

FIG. 9B is a timeline diagram illustrating the timing at which various RLP frames are transmitted in an exemplary cdma2000-like system in which there are two active supplemental channels. FIG. 9B illustrates a 220 ms time period in which CDMA frames containing RLP sequence numbers 0 through 16 are transmitted in an RLP3E data transmission system 950 consisting of a fundamental channel 951, a first supplemental channel 952, and a second supplemental channel 953. First supplemental 952 is configured to have a CDMA frame duration of 80 ms, and to have a 20 ms channel offset. Second supplemental 953 is configured to have a CDMA frame duration of 60 ms, and to have a 60 ms channel offset. As illustrated, fundamental channel 951 transmits 20 ms CDMA frames containing RLP3E frames of sequence numbers 0,1,3,4,6,7,9,11,12,13, and 16. First supplemental 952 transmits 80 ms CDMA frames containing RLP3E frames of sequence numbers 2,8,and 14. Second supplemental 953 transmits 60 ms CDMA frames containing RLP3E frames of sequence numbers 5, 10, and 15. As illustrated in FIG. 9A, frame 0 begins transmission at time 20 and finishes transmission at time 20.

At point 960, representative of the 20 ms supplemental channel offset, fundamental channel 951 finishes transmission of frame 0 (the frame containing RLP sequence number 2) and begins transmission of frame 1. Additionally, first supplemental 952 begins transmission of frame 2.

At point 970, representative of the 60 ms supplemental channel offset, fundamental channel 951 finishes transmission of frame 3, and begins transmission of frame 4. Additionally, second supplemental 953 begins transmission of frame 5.

At point 980, fundamental channel 951 finishes transmission of frame 6, and begins transmission of frame 7. Additionally, first supplemental 952 finishes transmission of frame 2, and begins transmission of frame 8.

At point 985, fundamental channel 951 finishes transmission of frame 7, and begins transmission of frame 9. Additionally, second supplemental 953 finishes transmission of frame 5, and begins transmission of frame 10.

At point 990, fundamental channel 951 finishes transmission of frame 12, and begins transmission of frame 13. Additionally, first supplemental 952 finishes transmission of frame 8, and begins transmission of frame 14. Finally, second supplemental 953 finishes transmission of frame 10, and begins transmission of frame 15.

FIG. 10 is an a timeline diagram illustrating alternate timing at which various RLP frames are transmitted in an exemplary cdma2000-like system in which there are two active supplemental channels. FIG. 10 illustrates a 100 ms time period in which CDMA frames containing RLP sequence numbers 0 through 9 are transmitted in an RLP3E data transmission system 1000 consisting of a fundamental channel 1001, a first supplemental channel 1002, and a second supplemental channel 1003. First supplemental 1002 is configured to have a CDMA frame duration of 80 ms, and to have a 20 ms channel offset. Second supplemental 1003 is configured to have a CDMA frame duration of 20 ms, and to have a 20 ms channel offset. As illustrated, fundamental channel 1001 transmits 20 ms CDMA frames containing RLP3E frames of sequence numbers 0,1,4,6, and 8. First supplemental 1001 transmits an 80 ms CDMA frames containing RLP3E frame of sequence number 3. Second supplemental 1003 transmits 20 ms CDMA frames containing RLP3E frames of sequence numbers, 2,5,7, and 9.

At point 1010, representative of the 20 ms supplemental channel offset, fundamental channel 1001 finishes transmission of frame 0 (the frame containing RLP sequence number 0) and begins transmission of frame 1. Additionally, first supplemental 1002 begins transmission of frame 3, and second supplemental 1003 begins transmission of frame 2.

At point 1020, fundamental channel 1001 finishes transmission of frame 1, and begins transmission of frame 4. Additionally, second supplemental 1003 finishes transmission of frame 2, and begins transmission of frame 5.

At point 1030, fundamental channel 1001 finishes transmission of frame 4, and begins transmission of frame 6. Additionally, second supplemental 1003 finishes transmission of frame 5, and begins transmission of frame 7.

At point 1040, fundamental channel 1001 finishes transmission of frame 6, and begins transmission of frame 8. Additionally, second supplemental 1003 finishes transmission of frame 7, and begins transmission of frame 9.

At point 1050, fundamental channel 1001 finishes transmission of frame 8, first supplemental 1002 finishes transmission of frame 2, and second supplemental 1003 finishes transmission of frame 9.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for preventing unnecessary negative acknowledgement frames in Radio Protocol Type 3, comprising:

receiving, on a first supplemental channel, Radio Link Protocol Type 3 frames having a first frame length;

receiving, on a second supplemental channel, Radio Link Protocol Type 3 frames having a second frame length, wherein the second frame length is different from the first frame length;

delivering the frames having the first frame length and the frames having the second frame length from a multiplex sublayer to a frame reordering sublayer;

buffering, by the frame reordering sublayer, of the frames until all frames transmitted prior to a current frame have been received;

determining, by the frame reordering sublayer, the order in which the frames were transmitted from a peer such that negative acknowledgement frames are not generated by unsequentially received frames;

reordering of the frames, by the frame reordering sublayer, in the order the frames were transmitted from the peer by means of timers and/or counters; and delivering the reordered frames to a Radio Link Protocol Type 3 sublayer.

2. A method for generating Radio Link Protocol Type 3 data frames, comprising:

receiving requests, at a Radio Link Protocol Type 3 sublayer, for data frames from a multiplex sublayer; and generating, by the Radio Link Protocol Type 3 sublayer, multiple new data frames, wherein a lowest new sequence number is placed in the new data frame having the smallest frame length and a highest new sequence number is placed in the new data frame having the largest frame length.

3. A method for delivering Radio Link Protocol Type 3 data frames to a Radio Protocol Type 3 sublayer, comprising:

determining a number of supplemental channels;

setting a counter and/or timer for each supplemental channel for ordering Radio Protocol Type 3 data frames of different frame lengths;

ordering received Radio Link Protocol Type 3 data frames according to a sequence number contained therein; and delivering the ordered Radio Link Protocol Type 3 data frames to the Radio Protocol Type 3 software sublayer.

4. A method for initializing a Radio Link Protocol Type 1 reordering sublayer, comprising:

determining a number of active supplemental channels;

determining a supplemental channel offset for each active supplemental channel;

assigning a supplemental channel frame duration for each supplemental channel; and initializing a timer to the channel offset for each active supplemental channel.

5. A mobile station, comprising:

a multiplex software sublayer for generating requests for Radio Link Protocol Type 3 data frames from a Radio Link Protocol Type 3 software sublayer, and for receiving sequentially numbered data frames from the Radio Link Protocol Type 3 software sublayer; and a frame reordering software sublayer for ordering data frames received from the multiplex software layer according to a sequence number, and delivering the ordered frames to the Radio Link Protocol Type 3 software sublayer.

6. A base station comprising:

a multiplex software sublayer for generating requests for Radio Link Protocol Type 3 data frames from a Radio Link Protocol Type 3 software sublayer, and for receiving sequentially numbered data frames from the Radio Link Protocol Type 3 software sublayer; and a frame reordering software sublayer for ordering data frames received from the multiplex software layer according to a sequence number, and delivering the ordered frames to the Radio Link Protocol Type 3 software sublayer.

7. A method of frame reordering in wireless communications system having a first supplemental channel and a second supplemental channel, wherein the second supplemental channel is configured to have a frame length different from a frame length of the first supplemental channel, comprising:

setting a timer for the first supplemental channel and the second supplemental channel for delaying the transmission of negative acknowledgment frames;

ordering received data frames according to a sequence number contained therein;

resetting the timer such that negative acknowledgements are not transmitted for unsequentially received data frames; and delivering the data frames to another software sublayer.

8. A Radio Link Protocol Type 3 frame reordering sublayer comprising:

buffers for buffering Radio Link Protocol Type 3 frames of different frame lengths having sequence numbers; and timers and/or counters for ordering the Radio Link Protocol Type 3 frames according to the sequence numbers.

9. A communications apparatus, comprising:

means for receiving requests, at a Radio Link Protocol Type 3 sublayer, for data frames from a multiplex sublayer; and means for generating, by the Radio Link Protocol Type 3 sublayer, multiple new data frames, wherein a lowest new sequence number is placed in the new data frame having the smallest frame length and a highest new sequence number is placed in the new data frame having the largest frame length.

10. A communications apparatus, comprising:

means for determining a number of supplemental channels;

means for setting a counter and/or timer for each supplemental channel for ordering Radio Protocol Type 3 data frames of different frame lengths;

means for ordering received Radio Link Protocol Type 3 data frames according to a sequence number contained therein; and means for delivering the ordered Radio Link Protocol Type 3 data frames to the Radio Protocol Type 3 software sublayer.

11. A communications apparatus, comprising:

means for setting a timer for the first supplemental channel and the second supplemental channel for delaying the transmission of negative acknowledgment frames;

means for ordering received data frames according to a sequence number contained therein;

means for resetting the timer such that negative acknowledgements are not transmitted for unsequentially received data frames; and means for delivering the data frames to another software sublayer.

12. A communications apparatus, comprising:

means for buffering Radio Link Protocol Type 3 frames of different frame lengths having sequence numbers; and means for ordering the Radio Link Protocol Type 3 frames according to the sequence numbers.

13. A computer readable media embodying a method for generating Radio Link Protocol Type 3 data frames, comprising:

receiving requests, at a Radio Link Protocol Type 3 sublayer, for data frames from a multiplex sublayer; and generating, by the Radio Link Protocol Type 3 sublayer, multiple new data frames, wherein a lowest new sequence number is placed in the new data frame having the smallest frame length and a highest new sequence number is placed in the new data frame having the largest frame length.

14. A computer readable media embodying a method for delivering Radio Link Protocol Type 3 data frames to a Radio Protocol Type 3 sublayer, comprising:

determining a number of supplemental channels;

setting a counter and/or timer for each supplemental channel for ordering Radio Protocol Type 3 data frames of different frame lengths;

ordering received Radio Link Protocol Type 3 data frames according to a sequence number contained therein; and delivering the ordered Radio Link Protocol Type 3 data frames to the Radio Protocol Type 3 software sublayer.

15. A computer readable media embodying a method for initializing a Radio Protocol Link Type 3 reordering sublayer, comprising;

determining a number of active supplemental channels;

determining a supplemental channel offset for each active supplemental channel;

assigning a supplemental channel frame duration for each supplemental channel; and initializing a timer to the channel offset for each active supplemental channel.

16. A computer readable media embodying a method of frame reordering in wireless communications system having a first supplemental channel and a second supplemental channel, wherein the second supplemental channel is configured to have a frame length different from a frame length of the first supplemental channel, comprising:

setting a timer for the first supplemental channel and the second supplemental channel for delaying the transmission of negative acknowledgment frames;

ordering received data frames according to a sequence number contained therein;

resetting the timer such that negative acknowledgements are not transmitted for unsequentially received data frames; and delivering the data frames to another software sublayer.

* * * * *